(12) United States Patent
Abiko et al.

(10) Patent No.: US 8,565,584 B2
(45) Date of Patent: Oct. 22, 2013

(54) EDITING APPARATUS AND EDITING METHOD

(75) Inventors: Ryo Abiko, Kanagawa (JP); Masakazu Murata, Kanagawa (JP)

(73) Assignee: Sony Corporation, Tokyo (JP)

( * ) Notice: Subject to any disclaimer, the term of this patent is extended or adjusted under 35 U.S.C. 154(b) by 1231 days.

(21) Appl. No.: 12/012,027

(22) Filed: Jan. 31, 2008

(65) Prior Publication Data

US 2008/0187281 A1 Aug. 7, 2008

(30) Foreign Application Priority Data

Feb. 2, 2007 (JP) ................................ P2007-024679
Feb. 2, 2007 (JP) ................................ P2007-024681

(51) Int. Cl.
*G11B 27/00* (2006.01)
*H04N 5/76* (2006.01)

(52) U.S. Cl.
USPC ........... 386/278; 386/246; 386/248; 386/281; 715/223; 715/721; 715/723; 715/732

(58) Field of Classification Search
USPC .......... 386/246, 248, 278, 281; 715/223, 721, 715/723, 732
See application file for complete search history.

(56) References Cited

U.S. PATENT DOCUMENTS

| 5,953,172 | A * | 9/1999 | Nakamura et al. ............... 360/64 |
| 6,278,678 | B1 * | 8/2001 | Iida .................................. 369/83 |
| 6,314,231 | B1 * | 11/2001 | Tanaka et al. .................. 386/282 |
| 6,434,103 | B1 * | 8/2002 | Shitara et al. .................... 369/83 |
| 6,584,273 | B1 * | 6/2003 | Ashley et al. .................. 386/281 |
| 6,782,188 | B1 * | 8/2004 | Ido et al. ......................... 386/278 |
| 7,054,541 | B2 * | 5/2006 | Persoon ......................... 386/283 |
| 2001/0036355 | A1 * | 11/2001 | Kelly et al. ....................... 386/52 |
| 2004/0234237 | A1 * | 11/2004 | Hamada et al. .................. 386/52 |
| 2005/0117878 | A1 * | 6/2005 | Murata et al. .................... 386/52 |
| 2006/0093315 | A1 * | 5/2006 | Kelly et al. ...................... 386/52 |
| 2006/0110111 | A1 * | 5/2006 | Van Gestel et al. ............. 385/95 |
| 2006/0210239 | A1 * | 9/2006 | Honda et al. .................... 386/52 |
| 2006/0216002 | A1 * | 9/2006 | Okada et al. ................... 386/112 |
| 2006/0233515 | A1 * | 10/2006 | Hino et al. ....................... 386/46 |
| 2007/0110394 | A1 * | 5/2007 | Yuasa .............................. 386/83 |
| 2008/0186829 | A1 * | 8/2008 | Abiko et al. ................... 369/100 |
| 2008/0285938 | A1 * | 11/2008 | Nakamura ....................... 386/52 |

FOREIGN PATENT DOCUMENTS

| JP | 9 18830 | 1/1997 |
| JP | 2001 216767 | 8/2001 |
| JP | 2003 168283 | 6/2003 |
| JP | 2005 142901 | 6/2005 |

\* cited by examiner

*Primary Examiner* — Philip Chea
*Assistant Examiner* — Shanto M Abedin
(74) *Attorney, Agent, or Firm* — Frommer Lawrence & Haug LLP; William S. Frommer

(57) ABSTRACT

An editing apparatus for video data creates a bridge file for connecting a first file and a second file to be edited based on designation of an IN point of the first file, an OUT point of the second file, and connection points of the both files, a frame preceding the connection point of the first file being made an OUT point and a frame following the connection point of the second file being made an IN point, and the bridge file connecting the OUT point and the IN point, records the bridge file into a recording medium recording the first and second files, and creates an editing result file having file system information indicating recording positions: from the IN point to the OUT point in the first file; from the IN point to the OUT point in the second file; and of the bridge file, in the recording medium.

13 Claims, 16 Drawing Sheets

FIG. 7
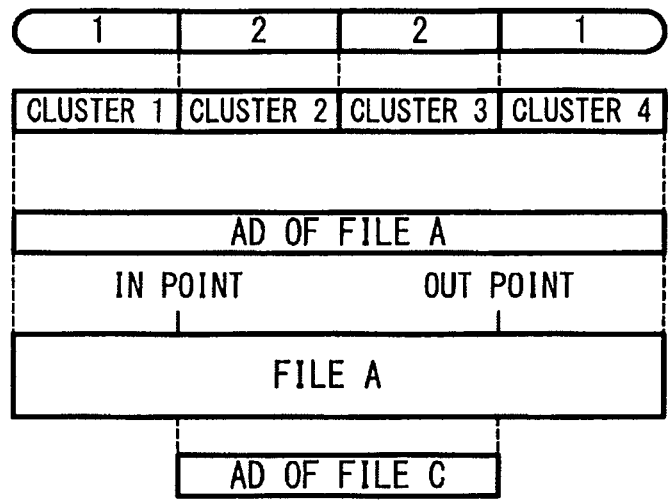
⇓ DELETE FILE A
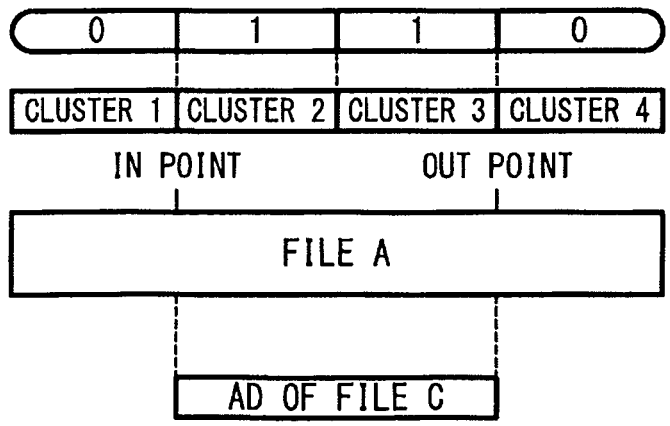

EDITING APPARATUS AND EDITING METHOD

CROSS REFERENCES TO RELATED APPLICATIONS

The present invention contains subject matter related to Japanese Patent Applications JP 2007-024679 and JP 2007-024681, filed in the Japanese Patent Office on Feb. 2, 2007, respectively, the entire contents of which being incorporated herein by reference.

BACKGROUND OF THE INVENTION

1. Field of the Invention

The present invention relates to an apparatus and a method for editing video data, a frame size of which is variable, such as video data coded in a Long GOP (Group Of Pictures) format. Also, the present invention relates to an apparatus and a method for editing video data, a frame size of which is variable, and recording file system information of an editing result.

2. Description of the Related Art

In the field of digital television broadcasting, a Long GOP format complying with MPEG-2 is employed for an encoding (compressing) format of video data. In the long GOP format, as is well known, a GOP consists of an I frame coded within a frame, and a P frame and a B frame coded by inter-frame prediction from a preceding frame or preceding and following frames, respectively.

The long GOP format has an advantage that a high compression rate can be realized by increasing the number of frames in one GOP. At the same time, however, since a picture is reproduced by a unit of a GOP, if an edition point designated by an editing operation is a frame in the middle of a GOP (the case becomes more frequent when the number of frames in a GOP is increased), a picture can not be reproduced by directly switching the picture at the edition point.

In related art, when cut-editing a file of video data coded in a Long GOP format, it is necessary to copy (relocate) a file to be edited into a recording medium in which the file to be edited is recorded.

Note that, although there is a reference disclosing an editing method in which only some frames within a GOP are replaced by other frames (for example Japanese Unexamined Patent Application Publication No. 09-18830), there is not known a reference disclosing an editing method for cut-editing video data coded in a Long GOP format.

SUMMARY OF THE INVENTION

A past method, in which a file of video data coded in a Long GOP format is cut-edited by copying of a file to be edited, consumes a recording medium capacity and also takes a longer time to edit by a time needed for copying. In particular, as video data is apt to be stored in a large capacity recording medium as recently, the data amount of a file to be edited can be large, and thereby such a problem becomes outstanding.

In view of the above problem, it is an object to enable video data, a frame size of which is variable, such as video data coded in a Long GOP format, to be cut-edited without copying a lot of data of a file to be edited.

If editing is carried out without copying a file to be edited, it is also a problem where and how to record file system information of an editing result.

Therefore, it is another object to enable video data, a frame size of which is variable, to be cut edited without copying a lot of data of a file to be edited, and also to enable file system information of an editing result to be recorded in a recording medium in which the file to be edited is recorded.

For addressing the above-described and other objects, according to an embodiment of the present invention, there is provided an editing apparatus for editing a file of video data, a frame size of which is variable, including a recording medium in which first and second files to be edited are recorded and a processing unit for performing the following processes.

The processing unit creates a bridge file for connecting the first file and the second file to be edited based on designation of an IN point of the first file, an OUT point of the second file, and connection points of the first file and the second file, a frame preceding the connection point of the first file being made an OUT point of the first file and a frame following the connection point of the second file being made an IN point of the second file, and the bridge file connecting the OUT point of the first file and the IN point of the second file, and records the bridge file into the recording medium in which the first and second files are recorded.

The processing unit also creates an editing result file which has information, as file system information, indicating a recording position from the IN point to the OUT point in the first file, a recording position from the IN point to the OUT point in the second file, and a recording position of the bridge file, in the recording medium.

Also, according to another embodiment of the present invention, there is provided an editing method in an editing apparatus for editing a file of video data, a frame size of which is variable, including the following steps.

The editing method includes the step of creating a bridge file for connecting a first file and a second file to be edited based on designation of an IN point of the first file, an OUT point of the second file, and connection points of the first file and the second file, a frame preceding the connection point of the first file being made an OUT point of the first file and a frame following the connection point of the second file being made an IN point of the second file, and the bridge file connecting the OUT point of the first file and the IN point of the second file.

The editing method also includes the step of recording the bridge file into a recording medium in which the first and second files are recorded.

The editing method further includes the step of creating an editing result file which has information, as file system information, indicating a recording position from the IN point to the OUT point in the first file, a recording position from the IN point to the OUT point in the second file, and a recording position of the bridge file, in the recording medium.

In the editing apparatus of the present invention for editing a file of video data, a frame size of which is variable, based on designation of the IN point, the connection points, and the OUT point of the first and second files to be edited, a frame preceding the connection point of the first file is made the OUT point of the first file and a frame following the connection point of the second file is made the IN point of the second file, and the bridge file connecting the OUT point of the first file and the IN point of the second file is created. Then, this bridge file is recorded into the recording medium in which the first and second files are recorded.

Further, the editing result file is created to have information, as file system information, indicating a recording position from the IN point to the OUT point of the first file, a recording position from the IN point to the OUT point of the second file, and a recording position of the bridge file, in this recording medium.

In this manner, only the bridge file that connects files to be edited each other is newly created and is recorded in the recording medium, while the files to be edited are not copied (relocated) in the recording medium and the information indicating the recording positions of parts thereof to be used for editing (frames from the IN points to the OUT points in the first and second files, respectively) is used for creating the editing result file. Thereby, it is possible to edit video data, a frame size of which is variable, without copying of a lot of data of files to be edited.

Further, according to still another embodiment of the present invention, there is provided an editing apparatus for editing a file of video data, a frame size of which is variable, including a recording medium in which first and second files to be edited are recorded and a processing unit for performing the following processes.

The processing unit creates a bridge file for connecting the first file and the second file to be edited based on designation of an IN point of the first file, an OUT point of the second file, and connection points of the first file and the second file, a frame preceding the connection point of the first file being made an OUT point of the first file and a frame following the connection point of the second file being made an IN point of the second file, and the bridge file connecting the OUT point of the first file and the IN point of the second file.

The processing unit records video data of the bridge file into the recording medium in which the first and second files are recorded, creates an editing result file which has information, as file system information, indicating a recording position from the IN point to the OUT point in the first file, a recording position from the IN point to the OUT point in the second file, and a recording position of the bridge file, in the recording medium, and records the file system information of the editing result file in an area where the video data of the bridge file has not been recorded in a last one of blocks in which the video data of the bridge file is recorded, the block being a recording unit of the recording medium.

Furthermore, according to still another embodiment of the present invention, there is provided an editing method in an editing apparatus for editing a file of video data, a frame size of which is variable.

The editing method includes the step of creating a bridge file for connecting a first file and a second file to be edited based on designation of an IN point of the first file, an OUT point of the second file, and connection points of the first file and the second file, a frame preceding the connection point of the first file being made an OUT point of the first file and a frame following the connection point of the second file being made an IN point of the second file, and the bridge file connecting the OUT point of the first file and the IN point of the second file.

The method further includes the step of recording video data of the bridge file into a recording medium in which the first and second files are recorded, creating an editing result file which has information, as file system information, indicating a recording position from the IN point to the OUT point in the first file, a recording position from the IN point to the OUT point in the second file, and a recording position of the bridge file, in the recording medium, and recording the file system information of the editing result file in an area where the video data of the bridge file has not been recorded in a last one of blocks in which the video data of the bridge file is recorded, the block being a recording unit of the recording medium.

In the editing apparatus of the present invention for editing a file of video data, a frame size of which is variable, based on designation of the IN point, the connection points, and the OUT point of the first and second files to be edited, a frame preceding the connection point of the first file is made the OUT point and a frame following the connection point of the second file is made the IN point, and the bridge file connecting the OUT point of the first file and the IN point of the second file is created.

Further, the editing result file is created to have, as the file system information, information indicating a recording position from the IN point to the OUT point of the first file, a recording position from the IN point to the OUT point of the second file, and a recording position of the bridge file, in this recording medium.

In this manner, only the bridge file that connects files to be edited each other is newly created and is recorded in the recording medium, while the files to be edited are not copied (relocated) in the recording medium and the information indicating the recording positions of parts thereof to be used for editing (frames from the IN points to the OUT points of the first and second files, respectively) is used for creating the editing result file. Thereby, it is possible to edit video data, a frame size of which is variable, without copying of a lot of data of files to be edited.

Further, when the video data of the bridge file is recorded into the recording medium in which the first and the second files to be edited are recorded, the file system information of the editing result file is recorded into an area where the video data of the bridge file has not been recorded in the last one of blocks in which the video data of the bridge file is recorded, the block being a recording unit in the recording medium.

In this manner, since file system information of an editing result file is recorded into a block recording a bridge file when video data of the bridge file is recorded, it is possible to record the file system information of the editing result file without additional consumption of a recording medium capacity while keeping the access performance (the bit rate of video data during recording/reproducing) of the recording medium.

The present invention may provide an advantage that video data, a frame size of which is variable, is edited without copying of a lot of data of a file to be edited.

Also, the present invention may provide an advantage that video data, a frame size of which is variable, is edited without copying of a lot of data of a file to be edited and also that file system information of an editing result file is recorded into a recording medium in which the file to be edited is recorded without additional consumption of a recording medium capacity while keeping the access performance (the bit rate of video data during recording/reproducing) of the recording medium.

BRIEF DESCRIPTION OF THE DRAWINGS

FIG. 7 is a diagram exemplifying a state of deleting a file to be edited.

DESCRIPTION OF THE PREFERRED EMBODIMENTS

Hereinbelow, an example of a video sever for television broadcasting according to an embodiment of the present invention will be described specifically by use of the drawings.

Video Sever According to an Embodiment of the Present Invention

Figure 1:
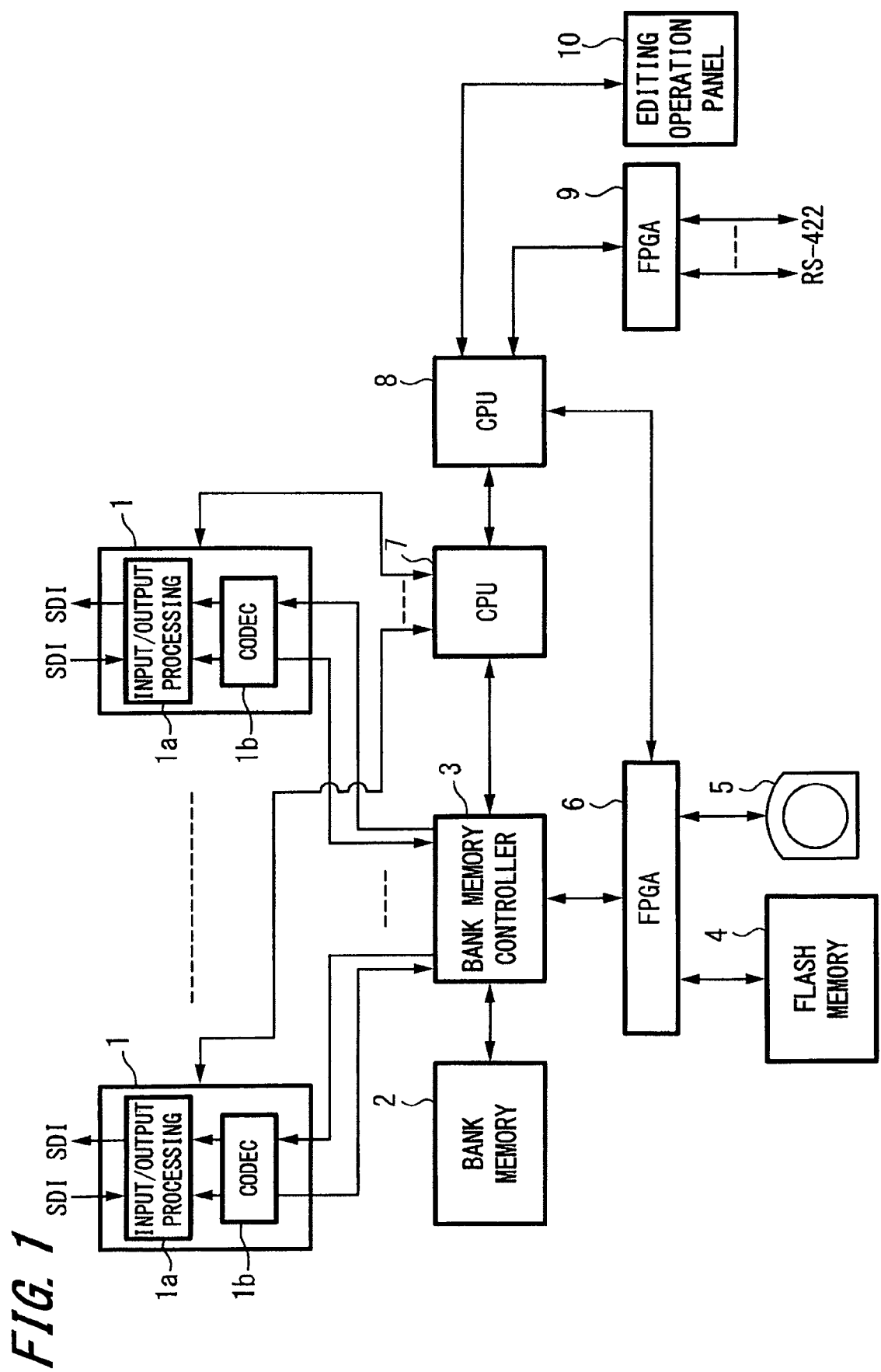
FIG. 1 is a diagram showing a whole configuration of a video server according to an embodiment of the present invention.

First, an example of a whole configuration of a video server according to an embodiment of the present invention will be described by use of FIG. 1. This video server includes the following units.

1. Multiple (e.g., five) SDI input/output ports 1 for inputting and outputting an SDI-standard serial digital signal
2. A bank memory 2 for recording AV data temporarily
3. A bank memory controller 3 for reading and writing AV data with respect to the bank memory 2
4. A flash memory 4 and an optical disk drive 5 with large capacities serving as main storages
5. An FPGA 6 including a low-performance processor for controlling the flash memory 4 and the optical disk drive 5
6. A CPU 7 for controlling the SDI input/output ports 1 and the bank memory controller 3
7. A CPU 8 for storing a file system managing AV data in each of the flash memory 4 and the optical disk drive 5 and a file manager that is a higher level program of the file system, and for controlling the whole video server
8. An FPGA 9 including a low-performance processor for sending a recording/reproducing command for each of the SDI input/output ports 1 received from outside using the RS-422 protocol to the CPU 8 and for converting a status from the CPU 8 into the RS-422 protocol to return it to outside 9. An editing operation panel 10 for carrying out cut-editing, etc. of AV data recorded in the flash memory 4 and the optical disk drive 5

When the FPGA 9 receives a recording command regarding any one of the SDI input/output ports 1, an SDI-standard serial digital signal input into the SDI input/output port 1 is converted into AV data in a parallel format in an input/output processing part 1a under the control of the CPU 8 and CPU 7, coded (compressed) by a codec 1b in a Long GOP format, sent to the bank memory controller 3, and written into the bank memory 2 frame by frame by the bank memory controller 3.

Then, each time a certain amount of the AV data from the SDI input/output port 1 is written, the AV data is read out from the bank memory 2 by the bank memory controller 3 under the control of the CPU 8 and the CPU 7, and recorded into the flash memory 4 or the optical disk drive 5 (depending on the designation of the recording command) as a file via the FPGA 6.

Also, when the FPGA 9 receives a reproducing command regarding any one of the SDI input/output ports 1, AV data is read out from the flash memory 4 or the optical disk drive 5 (depending on the designation of the reproducing command) under the control of the CPU 8 and the CPU 7 and the video data is written into the bank memory 2 by the bank memory controller 3 via the FPGA 6.

The AV data is read out frame by frame from the bank memory 2 by the bank memory controller 3 and is sent to the SDI input/output port 1. The AV data is decoded (expanded) in the Long GOP format by the codec 1b in the SDI input/output port 1, and is converted into an SDI-standard serial digital signal in the input/output processing part 1a to be output.

(Cut-Editing Process of a File in the Main Storage)

Figure 3A:
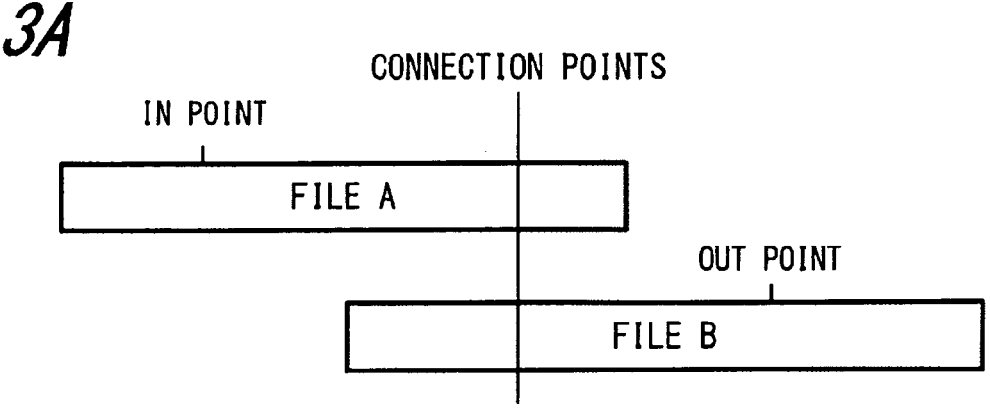
FIGS. 3A to 3C are diagrams exemplifying states of creating an editing result file by the process of FIG. 2.

Next, an example of a cut-editing process of a file in the main storage of this video server will be described. The editing operation panel 10 allows a cut-editing operation to be carried out on a GUI screen, while referring to proxy-data (video data with a lower resolution for the editing operation) of AV data recorded in the flash memory 4 or the optical disk drive 5, which is output from any one of the SDI input/output ports 1 to a monitor (or a display of the editing operation panel 10 connected to the SDI input/output port 1 with an HDMI (High-Definition Multimedia Interface) or the like). In this cut-editing operation, for cut-editing files A and B to be edited, it is possible to carry out an operation of designating an IN point of the file A, connection points of the files A and B (a frame in the middle of a GOP can be designated), and an OUT point of the file B, as illustrated in FIG. 3A. Also, an operation to instruct deletion of the file A or B to be edited can be carried out as needed.

Figure 2:
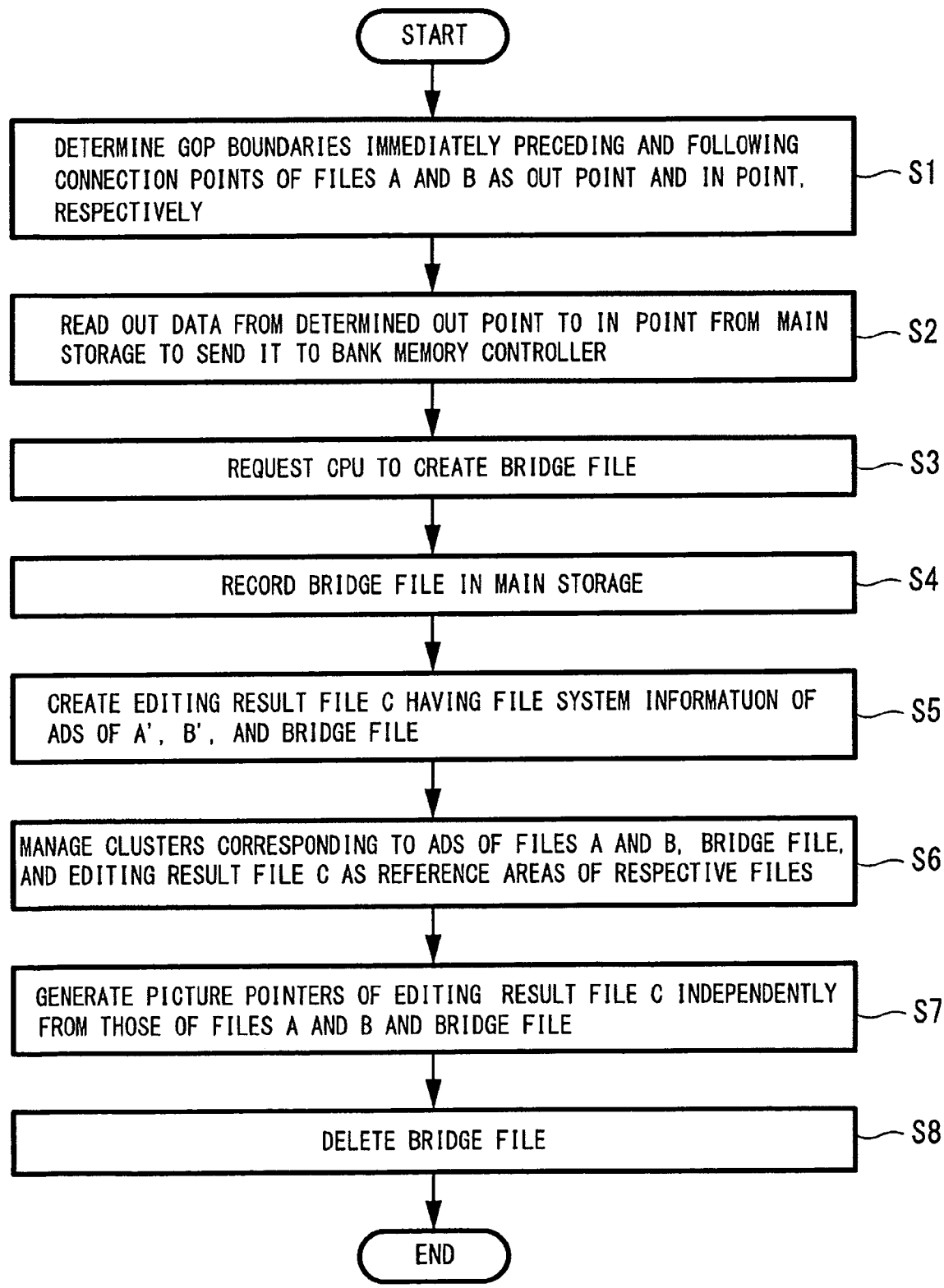
FIG. 2 is a flowchart showing a cut-editing process.

When information of such a cut-editing operation on the editing operation panel 10 is sent to the CPU 8, the CPU 8 executes a cut-editing process as shown in FIG. 2 as a processing by the above-described file system, file manager or the like.

Figure 3B:
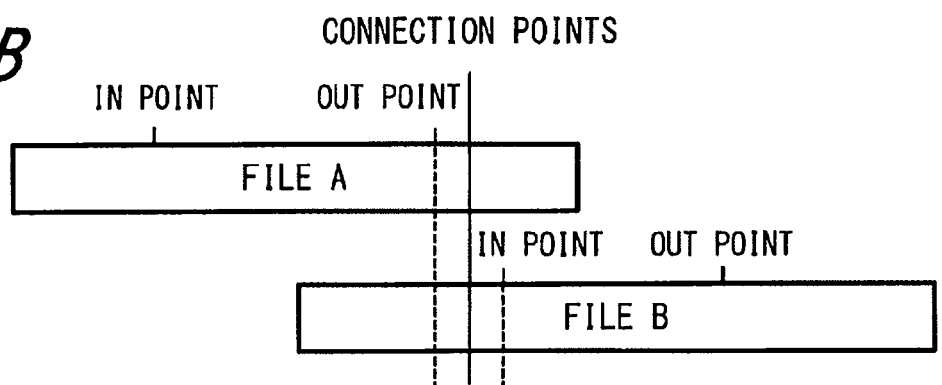

In this process, first, in two files to be edited (here also described as a file A and a file B), a frame at a GOP boundary immediately preceding a connection point in the file A is determined as an OUT point and a frame at a GOP boundary immediately following a connection point in the file B is determined as an IN point (step S1). FIG. 3B shows a state of the process of this step S1, corresponding to the operation described above with reference to FIG. 3A.

Following the step S1, frames from the OUT point (OUT point determined in the step S1) to the connection point in the file A and frames from the connection point to the IN point (IN point determined in the step S1) in the file B are read out from the main storage (flash memory 4 or optical disk drive 5 which records the files A and B), and are sent to the bank memory controller 3 (FIG. 1) via the FPGA 6 (step S2).

Then, a command is sent to the CPU 7 (FIG. 1) to make a request of creating a bridge file which is a file connecting the OUT point in the file A and the IN point in the file B (step S3).

Upon receiving the command, the CPU 7 creates the bridge file by re-coding the frames from the OUT point to the connection point in the file A and the frames from the connection point to the IN point in the file B, which have been sent to the bank memory controller 3, so as not to break down a VBV buffer complying with the MPEG standard (a virtual buffer corresponding to an input buffer of a decoder side apparatus).

This bridge file is created from frames, the number of which is equal to or less than the number of frames of one GOP in each of the files A and B, and therefore has a relatively small amount of data independently from a data amount of the frames from the IN point to the connection point in the file A or the frames from the connection point to the OUT point in the file B, designated by the cut-editing operation. The CPU 7 sends the created bridge file from the bank memory controller 3 to the main storage via the FPGA 6.

Figure 3C:

Following step S3, when the bridge file is sent to the main storage, the CPU 8 records the bridge file into a vacant area of the main storage (step S4). FIG. 3C shows a state of this process of the step S4, correspondingly to FIG. 3A and FIG. 3B.

Following the step S4, an editing result file (described as a file C) is created to have as file system information allocation information (called AD: Allocation Descriptor) that indicates a recording position of a part from the IN point to the OUT point in the file A (described as A'), a recording position of a part from the IN point to the OUT point in the file B (described as B'), and a recording position of the whole bridge file, in the main storage (step S5).

Figure 4:
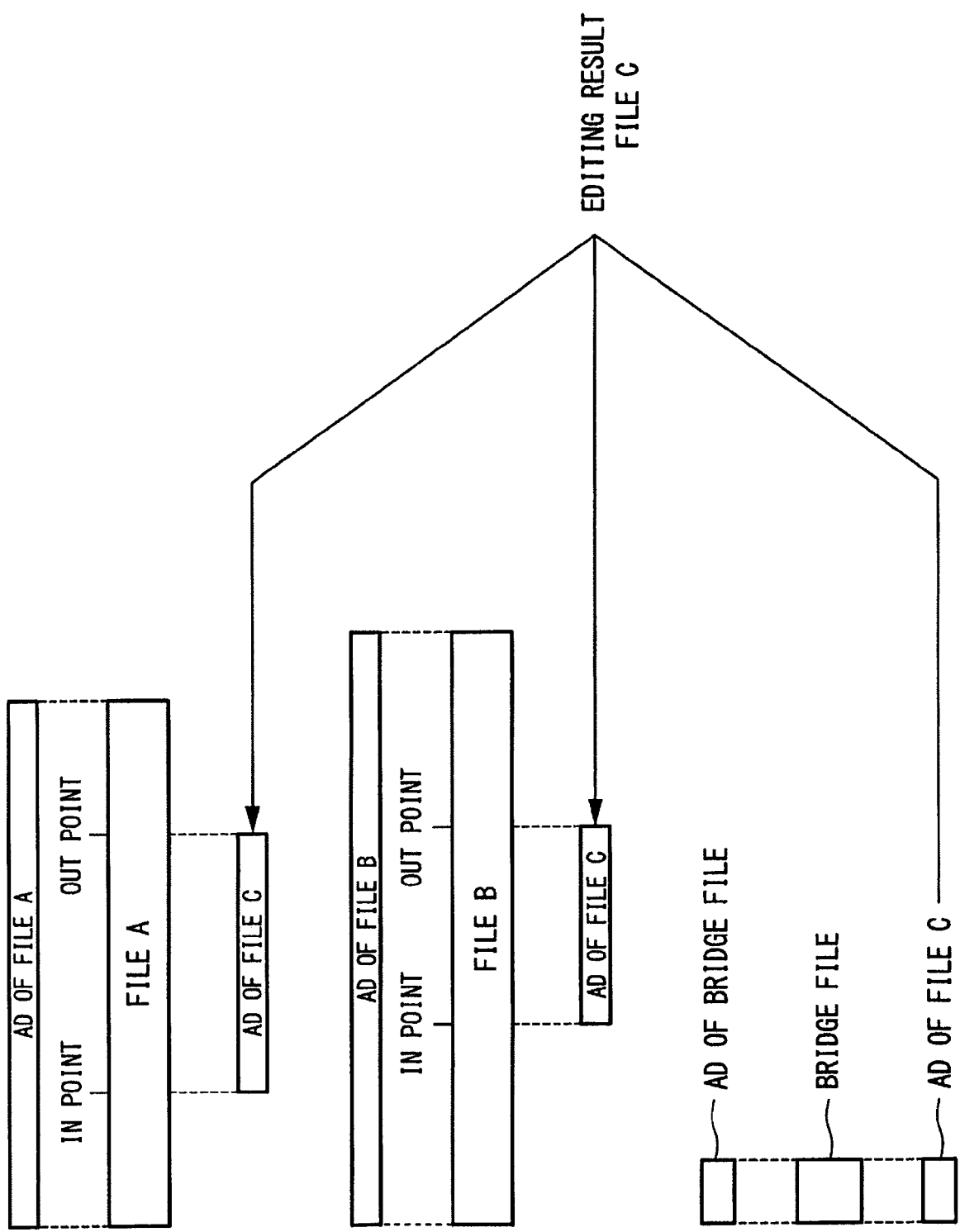
FIG. 4 is another diagram exemplifying a state of creating an editing result file by the process of FIG. 2.

FIG. 4 shows a state of this process in the step S5, in a manner corresponding to FIG. 3A, FIG. 3B and FIG. 3C. Here, ADs regarding the file A, the file B and the bridge file are generated as file system information when the file A, the file B, and the bridge file are recorded (the bridge file is recorded in the step S4), respectively.

Following the step S5, cluster management information is generated for managing the clusters corresponding to the ADs of the file A, the ADs of the file B, and the ADs of the bridge file as areas referred to by the file A, the file B, and the bridge file, respectively, and for managing the clusters corresponding to the ADs of the editing result file C as areas referred to also by the editing result file C, among clusters, each of which is a unit recording area in the main storage managed by the file system. Then, this cluster management information is stored into a memory of the CPU 8 (step S6).

Specifically, regarding the clusters corresponding to the ADs of the file A, the ADs of the file B, and the ADs of the bridge file, the number of references is set to be "1", since clusters are referred to by the file A, the file B, and the bridge file, respectively, when the file A, the file B, and the bridge file are recorded, and in the step S6, regarding the clusters corresponding to the ADs of the editing result file C among these clusters, the number of references is counted up to "2", since the clusters are referred to also by the editing result file. Then, this information about the number of references is made to be cluster management information.

Figure 5:
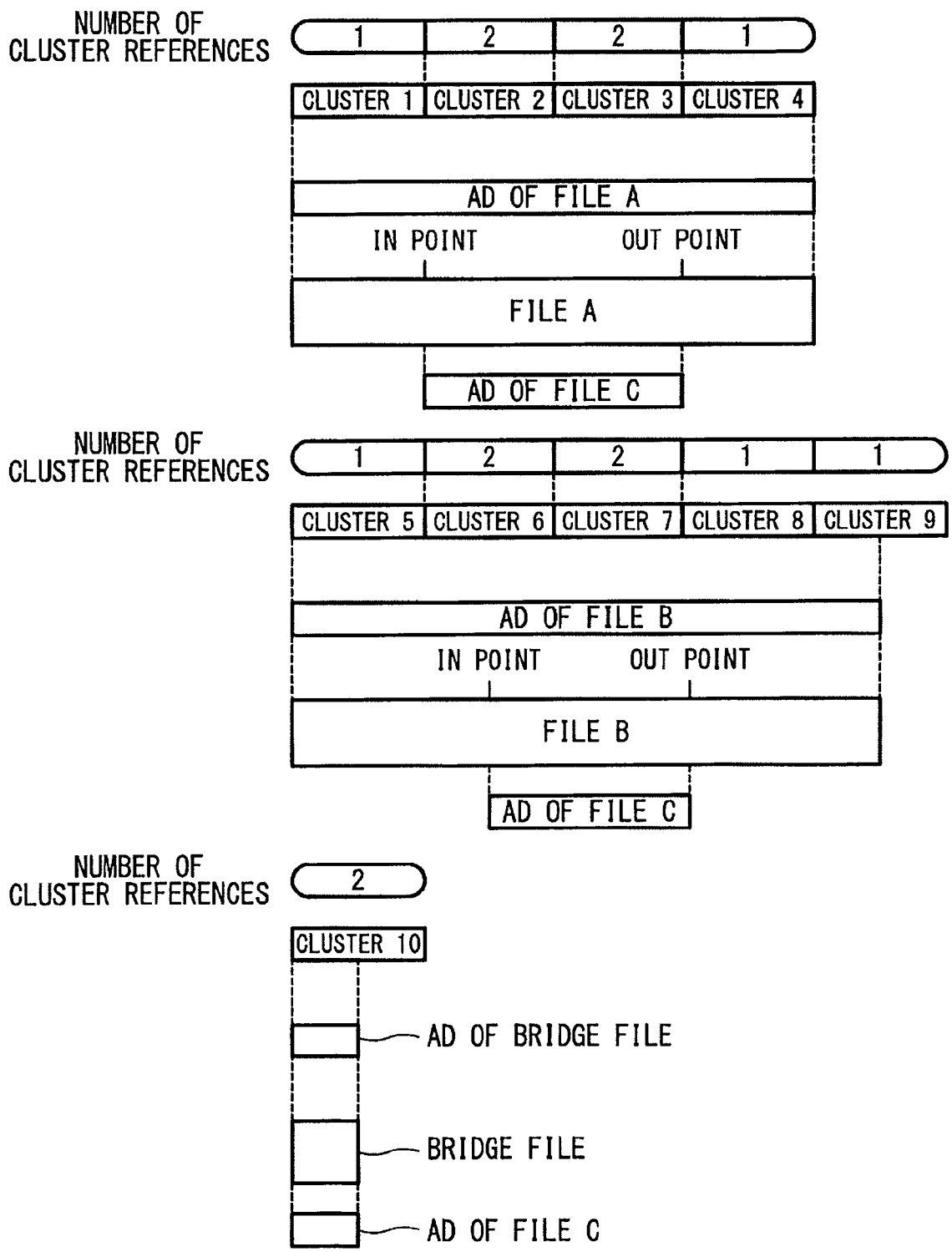
FIG. 5 is a diagram exemplifying a state of managing the number of references of clusters by the process of FIG. 2.

FIG. 5 shows a state of this process in the step S6, in a manner corresponding to FIG. 3A, FIG. 3B, FIG. 3C and FIG. 4. Among clusters (cluster numbers 1 to 4) corresponding to the ADs of the file A, the clusters (cluster numbers 2 and 3) correspond also to the ADs of the editing result file C and the number of references thereof becomes "2", and the numbers of references of other clusters (cluster numbers 1 and 4) remain "1". Also, among clusters (cluster numbers 5 to 9) corresponding to the ADs of the file B, the clusters (cluster number 6 and 7) correspond also to the ADs of the editing result file C and the number of references thereof becomes "2", and the numbers of references of other clusters (cluster numbers 5, 8, and 9) remain "1". Meanwhile, a cluster (cluster number 10) corresponding to the ADs of the bridge file, corresponds also to the ADs of the editing result file C and the number of references thereof becomes "2".

As shown in FIG. 2, following the step S6, index information (called a picture pointer) including address information and size information of each frame of the editing result file C is generated independently from picture pointers of the files A and B (step S7).

Because a frame size of AV data coded in the Long GOP format is not constant but variable, this picture pointer is necessary information for a quick access to an arbitrary frame. The picture pointers for the files A or B are generated at recording thereof.

Figure 6:
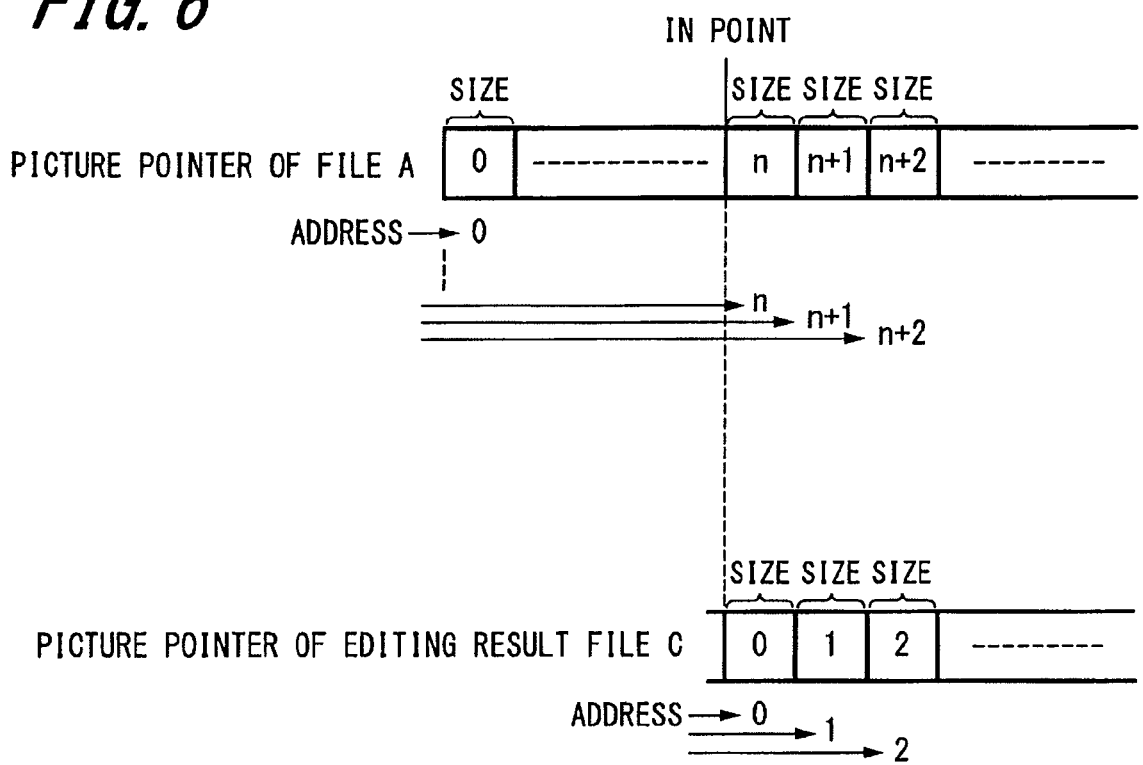
FIG. 6 is a diagram exemplifying a state of creating a picture pointer of the editing result file by the process of FIG. 2.

FIG. 6 is a diagram showing a state of generating the picture pointer of the editing result file C in this step S7, comparing with that of the picture pointer of the file A. Since a picture pointer addresses a frame from the top of a file, in the picture pointer of the file A, addresses of frames from the IN point are n, n+1, n+2, . . . (n is an integer of one or more). Meanwhile, in the editing result file C starting from the IN point of the file A, addresses of the frames from the same IN point are 0, 1, 2, . . . . The size information is the same among the frames from the IN point to the OUT point in the file A, the frames of the bridge file, and the frames from the IN point to the OUT point in the file B.

As shown in FIG. 2, following the step S7, the bridge file is deleted (step S8). Here, it should be noted that the file system stored in the CPU 8 carries out a file deleting process on the file system by decrementing by one the number of references of clusters (refer to FIG. 5) corresponding to the ADs of a file to be deleted and AV data itself is not deleted from the main storage. Therefore, deletion of the bridge file in the step S8 is also carried out only by counting down to "1" the number of references of a cluster with a cluster number corresponding to the ADs of the bridge file (cluster with cluster number 10 in FIG. 5). After having finished the step S8, the cut editing process is terminated.

By the above-described cut-editing process, when cut-editing a file of AV data coded in the Long GOP format, this video server newly creates only a bridge file with a small data amount for connecting files to be edited each other and records the bridge file into a main storage (the flash memory 4 or the optical disk drive 5), while the files to be edited are not copied (relocated) in the main storage, and an editing result file is created using information indicating recording positions of parts of the file A and file B to be used for editing (respective frames from the IN point to the OUT point of the files A and B).

Therefore, AV data coded in the Long GOP format can be edited without copying a large amount of data of files to be edited, and thereby it is possible to keep consumption of a main storage capacity to a minimum and to reduce a time necessary for editing.

Also, by managing the clusters referred to by files to be edited and the clusters referred to by an editing result file, respectively, among clusters, each of which is a unit of a recording area in the main storage, it is possible to treat the files to be edited and the editing result file independently without discrimination, and thereby it becomes possible even to delete the files to be edited.

Further, since address information and size information (picture pointer) of each frame, a recording position of which is indicated by an editing result file, is generated independently from picture pointers of files to be edited, even after the picture pointers of the files to be edited have been deleted on the file system by deletion of the files to be edited, it is possible to reproduce arbitrary frames of the editing result file by quickly accessing the editing result file based on the picture pointer of the editing result file.

FIG. 7 is a diagram showing in a manner corresponding to FIG. 5 a state of deleting the file A to be edited based on an operation on the editing operation panel 10. Among the clusters corresponding to the ADs of the file A (cluster numbers 1 to 4), the number of references of the clusters corresponding also to the AD of the editing result file C (cluster numbers 2 and 3) is counted down to "1", and the number of references of the other clusters (cluster numbers 1 and 4) is counted down to "0". The clusters (cluster numbers 1 and 4), the number of references of which has become "0", are open for unused areas allowing AV data of a new file to be recorded therein. The clusters corresponding to the ADs of the editing result file C (cluster numbers 2 and 3) have the number of references of "1" and do not allow AV data of a new file to be recorded therein to keep the originally recorded contents.

(Recording Process of File System Information of Files to be Edited and a Bridge File)

Next, regarding a recording process of file system information of files to be edited and a bridge file (ADs of the files A and B to be edited and the bridge file shown in FIG. 4) in the video server shown in FIG. 1, two examples will be described.

Example 1

Figure 8:
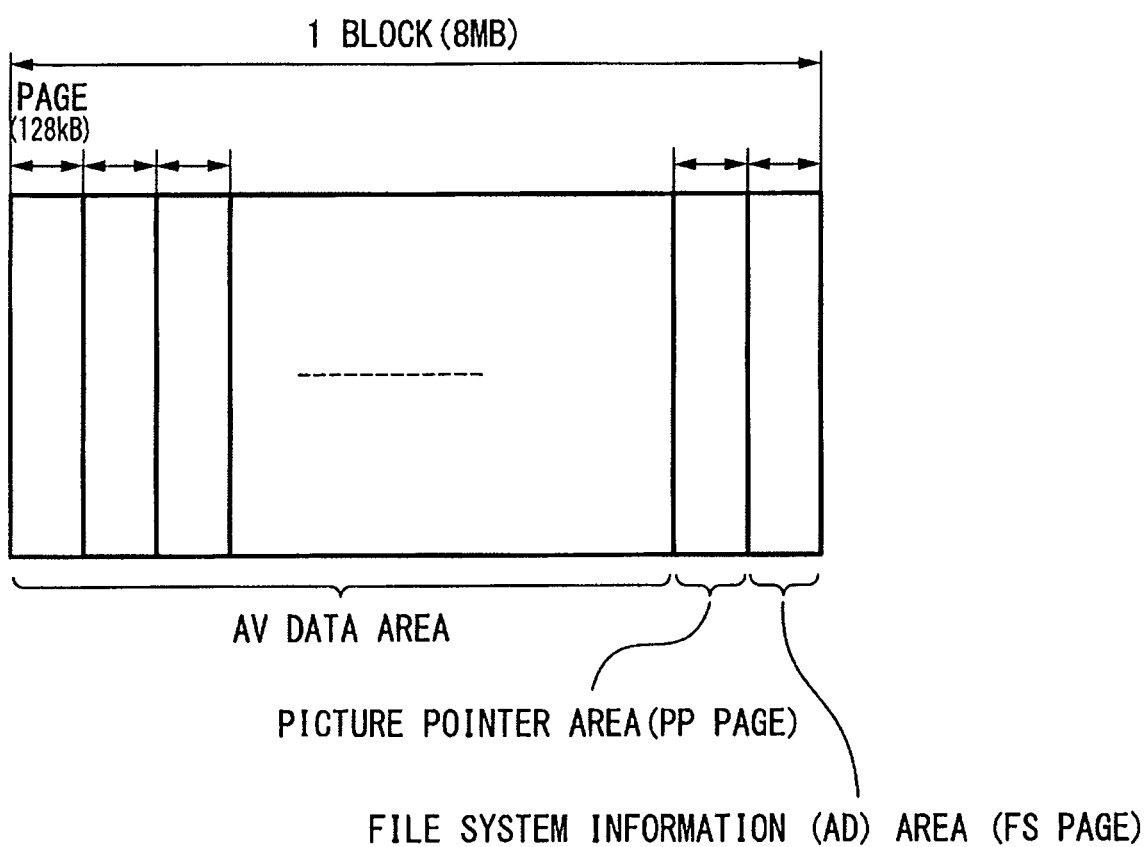
FIG. 8 is a diagram showing an example of allocating a recording area for file system information, when a file to be edited and a bridge file are recorded into a flash memory in FIG. 1.

First, a first example will be described. The CPU 8 (FIG. 1) treats a block of 8 Mbytes consisting of 64 pages (128 kbytes per page) as a cluster, a unit recording area, when recording a file to be edited or a bridge file into the flash memory 4. Then, as shown in FIG. 8, one page of a block is allocated to each of a FS page as an area of file system information (AD) and a PP page as an area of the above-described picture pointer (address information and size information of each frame).

Since each data amount of an AD and a picture pointer of AV data in one block is very small compared with the size of one page, it is possible to record ADs and picture pointers for AV data of a plurality of blocks in each one FS page and one PP page.

Figure 9:
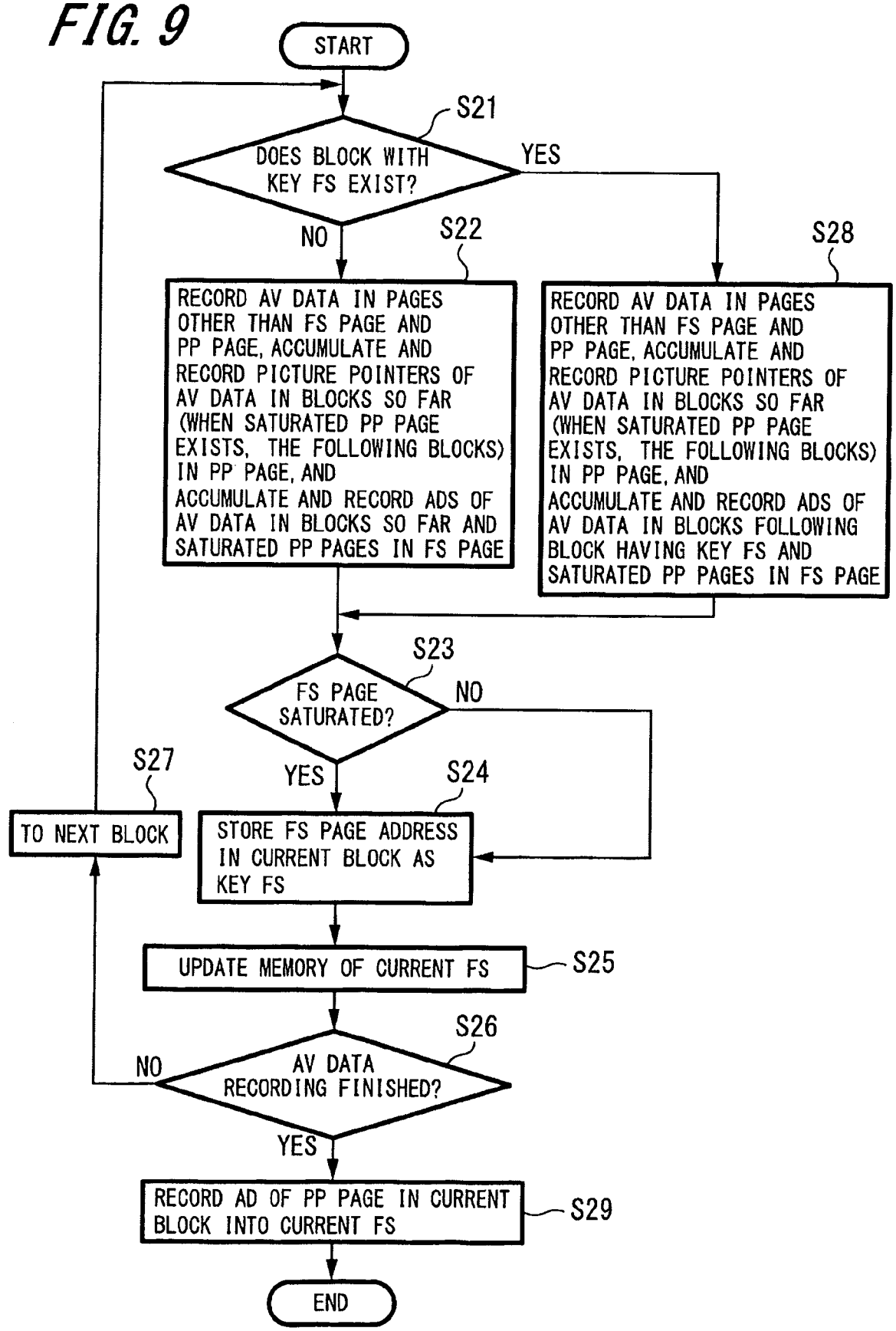
FIG. 9 is a flowchart showing an example of a recording process for AV data of a file to be edited and a bridge file, and file system information.

Then, when recording AV data of files to be edited and a bridge file, as a processing by the foregoing file system, file manager, or the like, the CPU 8 carries out a recording process of AV data and file system information as shown in FIG. 9.

In this process, first, before recording AV data in a current block, whether or not AV data is already recorded in a block in which a key FS (to be described later) exists, is determined (step S21).

If the answer in step S21 is NO, in the current block, the AV data is recorded in pages other than an FS page and a PP page, picture pointers of AV data in blocks in which AV data has been recorded so far (including the current block) (here, in a case that there exists a PP page saturated by recording picture pointers of 128 kbytes, picture pointers of AV data in the following blocks) are accumulated and recorded in the PP page, and ADs of the AV data in the blocks in which the AV data has been recorded so far (including the current block) and ADs of saturated PP pages are accumulated and recorded in the FS page (step S22).

Then, whether or not the FS page in the current block is saturated (whether ADs of 128 kbytes are recorded) is determined (step S23).

If the answer in step S23 is NO, in the memory of the CPU 8, the stored contents of a current FS address representing the latest FS page are updated to an address of the FS page in the current block (step S25). Meanwhile, if the answer in step 323 is YES, the address of the FS page in the current block is stored in the memory of the CPU 8 as a key FS address (step S24), and the process goes to a step S25.

Then, whether or not recording of the whole AV data has been finished is determined (step S26). If the answer in step S26 is NO, the process moves to the next block for recording (step S27), and then returns to the step S21.

If the answer is YES in the step S21, in the current block, the AV data is recorded into pages other than an FS page and an PP page, picture pointers of AV data in blocks in which AV data has been recorded so far (including the current block) (here, when there exists a saturated PP page, picture pointers of AV data in the following blocks) are accumulated and recorded in the PP page, and ADs of AV data in blocks following a block in which the key FS exists (including the current block) and ADs of saturated PP pages are accumulated and recorded in the FS page (step S28). Then, the process goes to the step S23.

If the answer is YES in the step S26, an AD of the PP page in the current block is further recorded in the FS page that has become the current FS (step S29), and the process is terminated.

Figure 10:
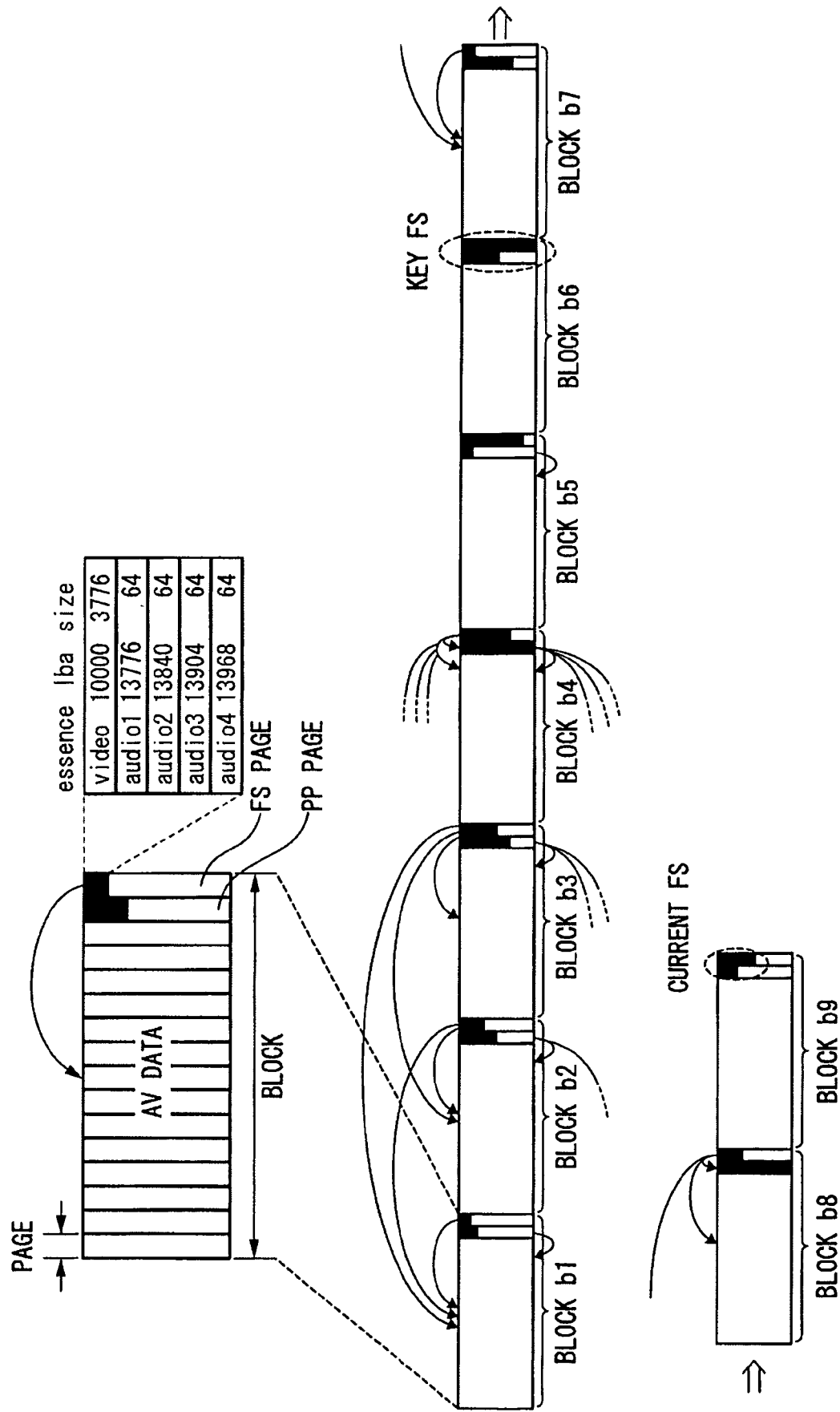
FIG. 10 is a diagram exemplifying a state of recording AV data of a file to be edited and a bridge file, and file system information.

FIG. 10 is a diagram exemplifying a state of recording AV data and file system information by the process of FIG. 9. In the first block b1, AV data is recorded and also a picture pointer of the AV data in the block b1 is recorded in a PP page, and an AD of the AV data in the block b1 (a leading address and a size of each essence: video and each of audio channels 1 to 4) is stored in an FS page (step S22 in FIG. 9).

In the next block b2, AV data is recorded, and also picture pointers of the AV data in the blocks b1 and b2 are recorded in a PP page, and ADs of the AV data in the blocks b1 and b2 are recorded in an FS page (step S22 in FIG. 9). In the next block b3, AV data is recorded, and also picture pointers of the AV data in the blocks b1 to b3 are recorded in a PP page and ADs of the AV data in the blocks b1 to b3 are stored in an FS page (step S22 in FIG. 9).

In the following block b4, AV data is recorded, and also picture pointers of the AV data in the blocks b1 to b4 are recorded in a PP page. Also, since the PP page has been saturated, ADs of the AV data in the blocks b1 to b4 and an AD of the PP page in the block b4 are stored in an FS page (step S22 in FIG. 9).

In the next block b5, AV data is recorded, and also a picture pointer of the AV data in the block 5 is recorded in a PP page, and ADs of the AV data in the blocks b1 to b5 and the AD of the PP page in the block b4 are stored in an FS page (step S22 in FIG. 9) (after the block b4, only some arrows are shown for indicating corresponding relationships between a PP page or an FS page and blocks).

In the next block b6, AV data is recorded, and also picture pointers of the AV data in the blocks b5 and b6 are recorded in a PP page, and ADS of the AV data in the blocks b1 to b6 and the AD of the PP page in the block b4 are stored in an FS page (step S22 in FIG. 9), resulting in that the FS page has been saturated to become a key FS (step S24 in FIG. 9).

In the next block b7, AV data is recorded, and also picture pointers of the AV data in the blocks b5 to b7 are recorded in a PP page, and an AD of the AV data in the block b7 is recorded in an FS page (step S28 in FIG. 9).

In the next block b8, AV data is recorded, and also picture pointers of the AV data in the blocks b5 to b8 are recorded in a PP page. Also, since the PP page has been saturated, ADs of the AV data in the blocks b7 and b8 and an AD of the PP page in the block b8 are stored in an FS page (step S28 in FIG. 9).

In the next block b9, AV data is recorded, and also a picture pointer of the AV data in the block b9 is recorded in a PP page, and ADs of the AV data in the blocks b7 to b9 and the AD of the PP page in the block b8 are stored in an FS page (step S28 in FIG. 9). Then, since recording of the AV data has finished at the block b9, an AD of the PP page in the block b9 is also recorded in the FS page in the block b9 that has become the current FS (step S29 in FIG. 9).

By this recording process, since the flash memory 4 is not accessed only for recording file system information (AD) and picture pointers, and the file system information and the picture pointers are recorded in the same block and at the same time when AV data is recorded, it is possible to record the file system information and the picture pointers that are frequently updated and have small amounts of data to be updated, while keeping the access performance of the flash memory 4 (the bit rate of AV data during recording/reproducing).

Further, ADs of AV data and ADs of PP pages in all the blocks are recorded in a key FS and a current FS. For example, in the example in FIG. 10, the ADs of the AV data in the blocks b1 to b6 and the AD of the PP page in the block b4 (i.e., the allocation information of picture pointers regarding the AV data in the blocks b1 to b4) are recorded in the key FS, the ADs of the AV data in the blocks b7 to b9 and the ADs of the PP pages in the blocks b8 and b9 (i.e., the allocation information of picture pointers regarding the AV data in the blocks b5 to b9) are recorded in the current FS.

Therefore, by reading out only a key FS page and a current FS page, it is possible to obtain ADs of the whole AV data recorded, and also to obtain ADs of PP pages recording picture pointers of the whole AV data recorded. In particular, since the flash memory 4 is accessed without a seek, it is possible to obtain the ADs and the picture pointers instantly from a plurality of these distributed pages. Thereby, it becomes possible to manage file system information and picture pointers of files to be edited and a bridge file, while keeping the access performance of the flash memory 4.

Example 2

Figure 11:
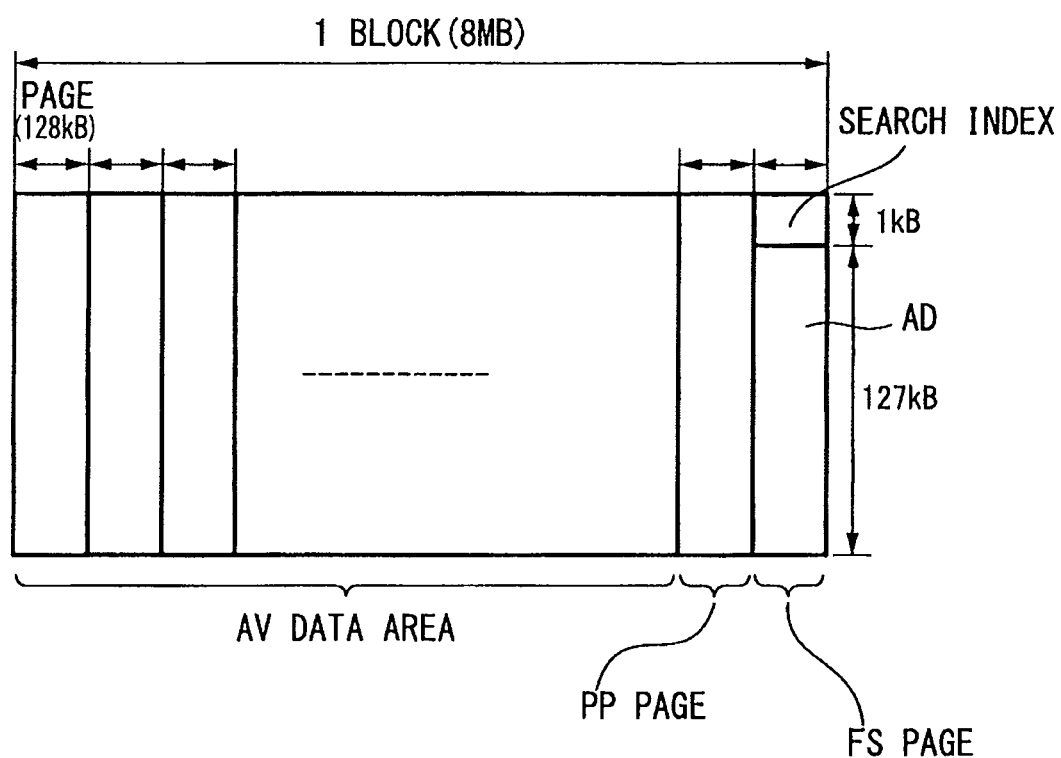
FIG. 11 is a diagram showing an example of allocating a recording area for file system information when a file to be edited and a bridge file are recorded into the flash memory in FIG. 1.

Next, the second example of a recording process for file system information of files to be edited and a bridge file will be described. The CPU 8 (FIG. 1) also treats a block as a cluster, which is a unit of recording area, when recording files to be edited and a bridge file into the flash memory 4. Then, as shown in FIG. 11, one page in a block is allocated to each of a FS page, which is an area for the file system information (AD), and a PP page, which is an area for a picture pointer (address and size information of each frame). (So far the same as in FIG. 8.)

Further, in this FS page, an area of 1 kbytes, for example, is made an area for recording an address of an FS page already saturated as a search index and the remaining area of 127 kbytes is made an area for the AD. Here, assuming the area for the search index to be 1 kbytes is only an example, and the number of bytes of the area for the search index may be determined according to a data amount of AV data so as to be capable of recording addresses of all the saturated FS pages, because the number of saturated FS pages is increased as the data amount of the AV data increases.

Figure 12:
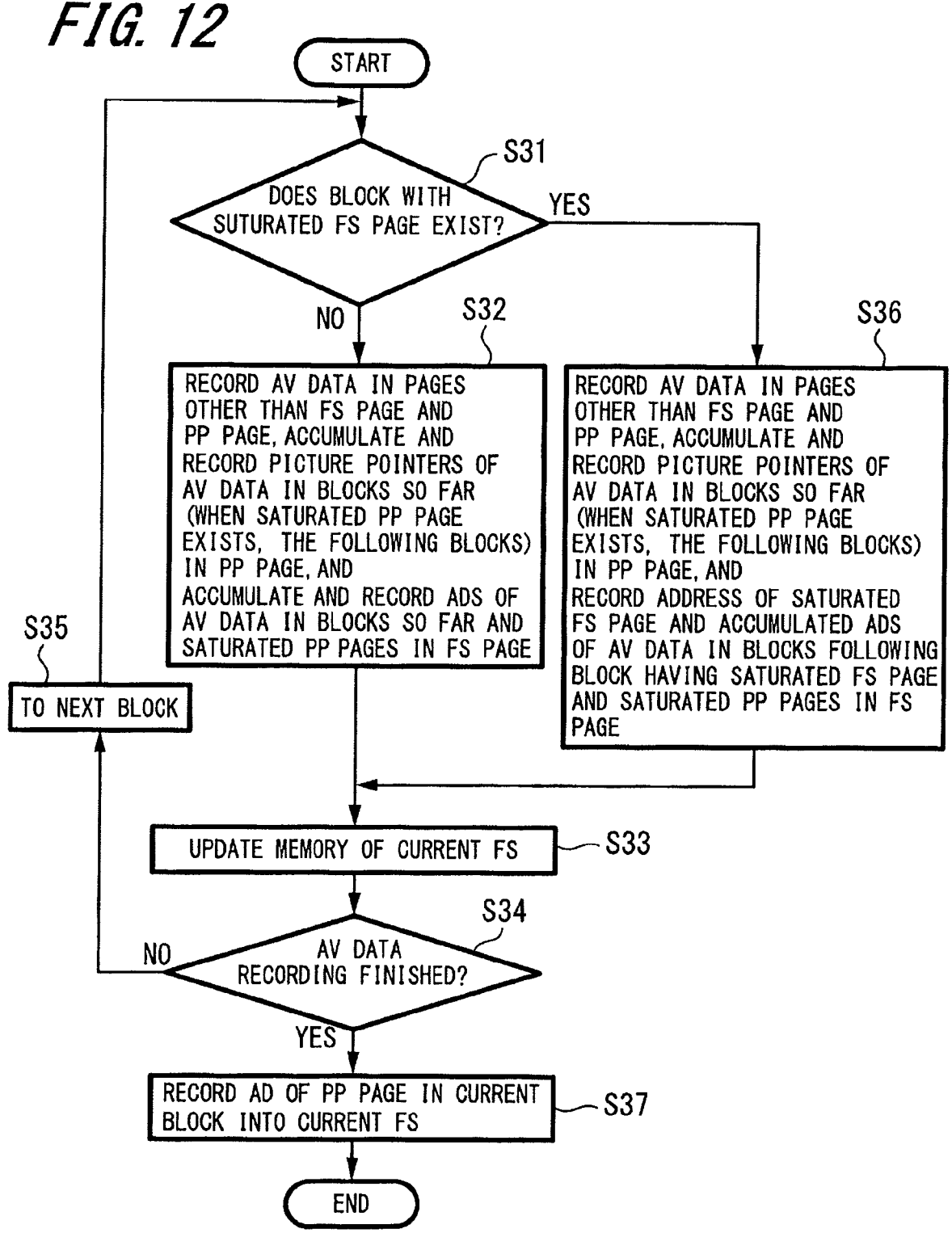
FIG. 12 is a flowchart showing an example of recording process for AV data of a file to be edited and a bridge file, and file system information.

Then, when recording AV data of the files to be edited and a bridge file, the CPU 8 carries out a recording process of the AV data and file system information as shown in FIG. 12 as a processing using the above-described file system, file manager, or the like.

In this process, first, whether or not AV data is already recorded in a block in which an FS page is saturated is determined before AV data is recorded in a current block (step S31).

If the answer in step S31 is NO, in the current block, the AV data is recorded in pages other than an FS page and a PP page, picture pointers of AV data in blocks in which AV data has been recorded so far (including the current block) (when there exists an saturated PP page, picture pointers of AV data in the following blocks) are accumulated and recorded in the PP page, and ADs of the AV data in the blocks in which the AV data has been recorded so far (including the current block) and ADs of saturated PP pages are accumulated and recorded in an AD area of an FS page (step S32).

Then, in the memory of the CPU 8, stored contents of a current FS address which indicates the latest FS page is updated to an address of the FS page in the current block (step S33).

Then, whether or not recording of the AV data has finished is determined (step S34). If the answer in step S34 is NO, the process moves to the next block to be recorded (step S35), and then returns to the step S31.

If the answer is YES in the step S31, in the current block, the AV data is recorded in pages other than a PP page and an FS page, picture pointers of AV data in blocks in which AV data has been recorded so far (including the current block) (when there exists a saturated PP page, picture pointers of AV data in the following blocks) are accumulated and recorded in the PP page. Also, addresses of all the saturated FS pages are recorded in a search index area of the FS page, and ADs of AV data in blocks following a block in which a saturated FS page exists (including the current block) and ADs of saturated PP pages are accumulated and recorded in an AD area of the FS page (step S36). Then, the process goes to the step S33.

If the answer is YES in the step S34, an AD of the PP page of the current block is further recorded in the FS page which has become a current FS (step S37), and the process is terminated.

Figure 13:
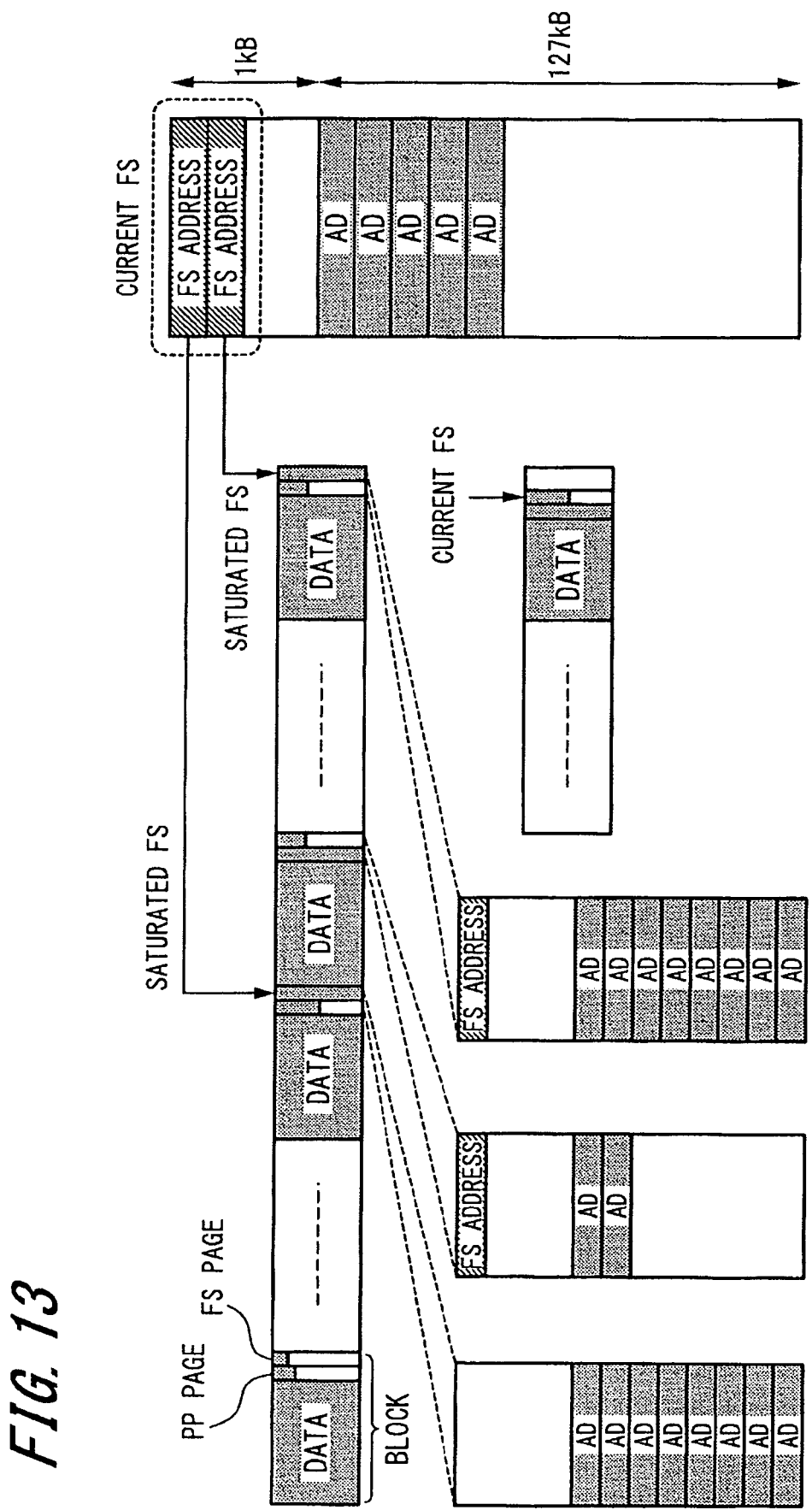
FIG. 13 is a diagram exemplifying a state of recording AV data of a file to be edited and a bridge file, and file system information.

FIG. 13 is a diagram illustrating a state of recording AV data and file system information by the process shown in FIG. 12. Addresses of all the saturated FS pages (described as FS addresses) are recorded in a search index area in a current FS. Also, ADs of AV data and saturated PP pages in all the blocks following the block in which a saturated FS page exists and an AD of the PP page of the current block are recorded in an AD area of the current FS, as in the FS page of the block b9 illustrated in FIG. 10.

By this recording process, since the flash memory 4 is not accessed only for recording file system information (AD) and picture pointers and the file system information and the picture pointers are recorded in the same block and at the same time when AV data is recorded, it is possible to record the file system information and the picture pointers that are frequently updated and have small amounts of data to be updated, while keeping the access performance of the flash memory 4 (the bit rate of AV data during recording/reproducing). (So far it is the same as the recording process of [Example 1].)

Further, as exemplified in FIG. 13, the addresses of all the saturated FS pages are recorded in the search index area of the current FS. Therefore, by reading out a page of the current FS, and then by reading out the saturated FS pages, the addresses of which are recorded in the area of the search index area thereof, it is possible to obtain ADs of the whole recorded AV data and also to obtain the ADs of the PP pages recording the picture pointers of the whole recorded AV data.

That is, in the recording process of [Example 2], only one address of the current FS has to be stored, while in the recording process of [Example 1], the number of pages to store addresses of FS pages is not constant because key FS addresses and current FS addresses are stored (increase in a data amount of AV data increases the number of saturated FS pages, resulting in increase of the key FS). Thereby, it becomes possible to manage file system information and picture pointers of files to be edited and a bridge file further more easily, while keeping then access performance of the flash memory 4.

In these [Example 1] and [Example 2], a case in which files to be edited and a bridge file are recorded in the flash memory 4 has been described. However, it is not limit to this case. When files to be edited and a bridge file are recorded in the optical disk drive 5 (FIG. 1), a part of each recording unit (cluster) of the optical disk may be allocated to each of the areas for file system information and picture pointers, and the same process as shown in FIG. 9 or 12 may be carried out. Further, in a recording system such as a video server provided with a hard disk drive for a main storage, a part of each recording unit (cluster) of the hard disk drive may be allocated to each of the areas for file system information and picture pointers, and the same process as shown in FIG. 9 or 12 may be carried out.

Here, an optical disk drive or a hard disk drive is a device having an issue of a seek, differently from a flash memory, and a long readout time will be a problem when file system information or picture pointers are recorded in a distributed manner by the process of FIG. 9 or 12. Then when the process in FIG. 9 or 12 is applied to an optical disk drive or a hard disk drive, file system information and picture pointers recorded in the optical disk drive or the hard disk drive may be loaded as backup data at system start-up on a device in which seek time is not an issue such as the memory in the CPU 8 so that a reading out operation of the file system information and the picture pointers is carried out using the device, and thereby system reliability can be improved.

(Recording Process for File System Information of an Editing Result File)

Next, in the video server shown in FIG. 1, an example of recording process for file system information of an editing result file (ADs of the editing result file C shown in FIG. 4) will be described.

In the cut-editing process shown in FIG. 2, the editing result file C is created to have ADs (allocation information) indicating the recording positions from the IN points to the OUT points of the files to be edited (files A and B) and the recording position of the whole bridge file as the file system information (step S5). However, whether new ADs are generated for ADs of this editing result file C (refer to FIG. 4) or the already generated ADs of the files to be edited and the bridge file are utilized without any change (without generating new ADs) is not mentioned in this cut-editing process.

Here, there is considered a case in which after the recording process of AV data and file system information has been carried out as shown in FIGS. 8 to 10 or FIGS. 11 to 13 regarding the files to be edited and the bridge file, ADs of files to be edited and a bridge file are utilized for ADs of an editing result file C without any change.

Figure 14:
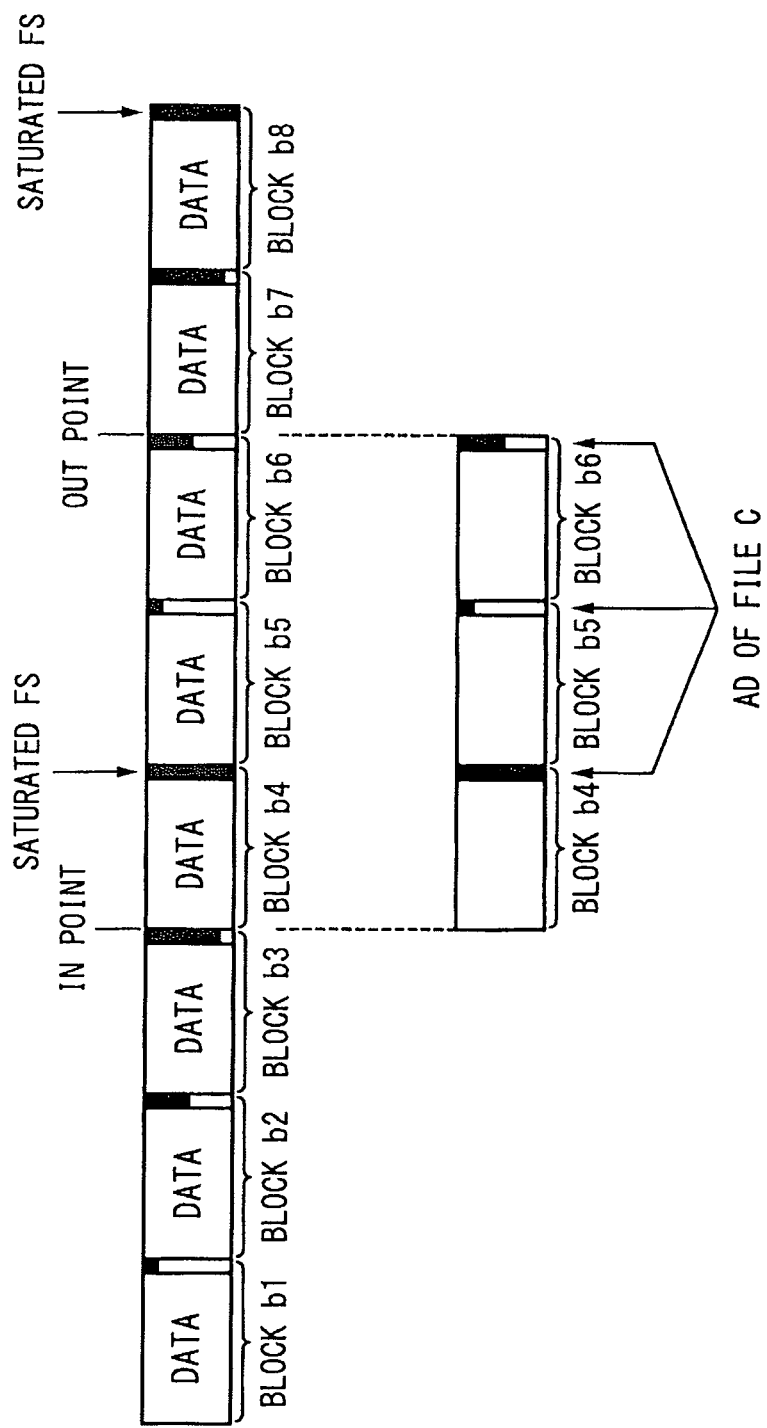
FIG. 14 is a diagram exemplifying a case where an AD of a file to be edited is used as an AD of an editing result file C without any change.

FIG. 14 is a diagram showing a case that the ADs of the file A are utilized for ADs of the editing result file C without any change, assuming that the AV data from the IN point to the OUT point in this file A shown in FIG. 3B is recorded in a block b4 in which a saturated FS page exists and in the following two blocks b5 and b6 among blocks of the flash memory 4 as shown in FIG. 10 or FIG. 13 (PP pages are omitted from the drawing of FIG. 14). In this case, the ADs of the file A recorded in the FS pages in the blocks b4 to b6 are used as the ADs of the editing result file C.

However, while only the ADs of AV data in the blocks b5 and b6 which is an edit result part in the file A (in the range from the IN point to the OUT point) are recorded in FS pages in the blocks b5 and b6, both an AD of AV data in the block b4 which is an edit result part and ADs of AV data in the blocks b1 to b3 which is not an edit result part are recorded in the block b4. Therefore, there is not file system information representing only a recording position of AV data in the block b4, which is an edit result part.

For avoiding such a situation, it is preferable to newly generate file system information (AD) of the whole editing result file C. Here, since the editing result file C does not copy AV data itself but utilizes AV data in files to be edited and a bridge file without any change (AV data is managed by the number of references as exemplified in FIG. 5), file system information thereof can not be recorded by the process as shown in FIGS. 8 to 10 or FIGS. 11 to 13 regarding files to be edited and a bridge file.

Figure 15:
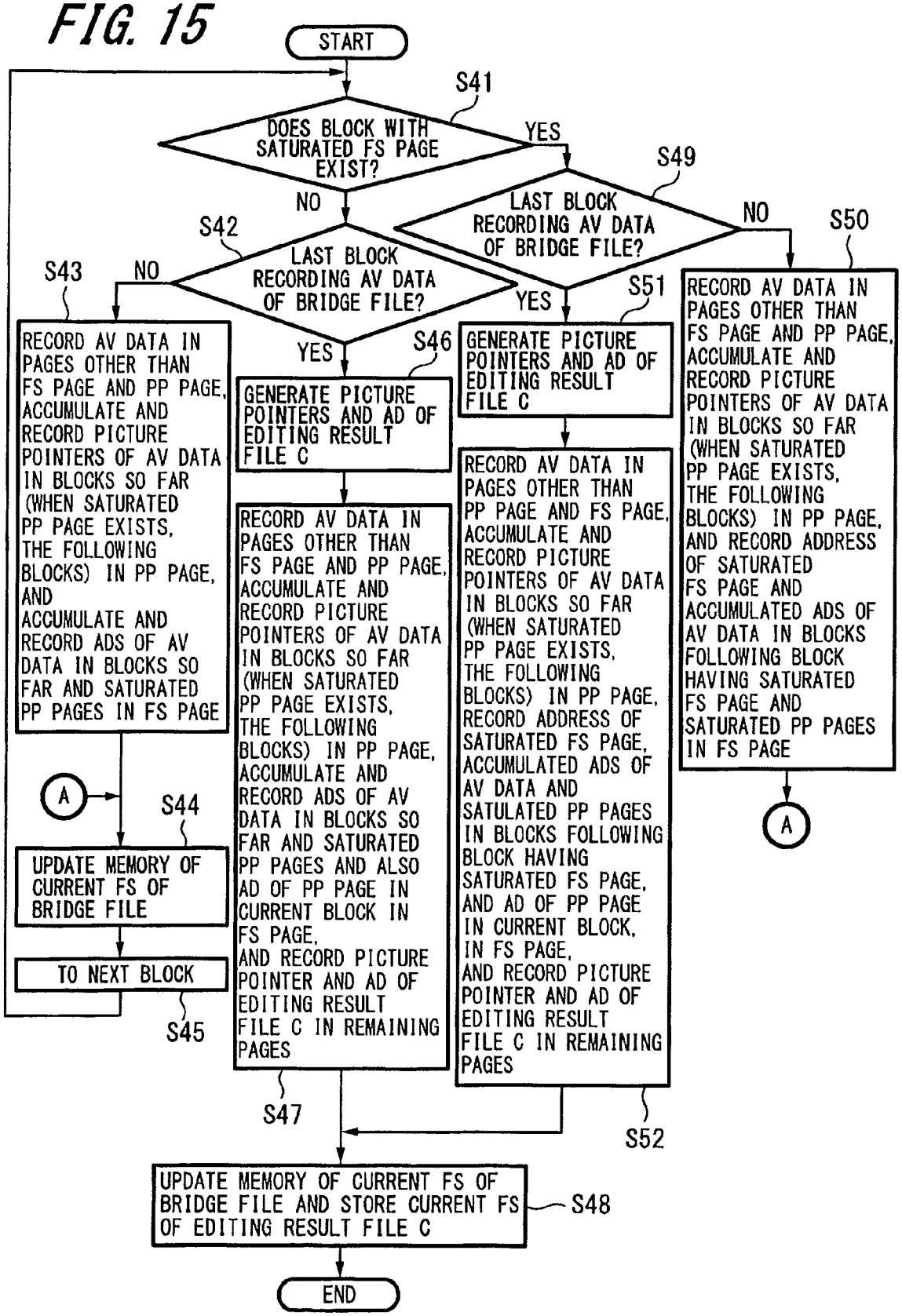
FIG. 15 is a flowchart showing an example of a recording process for AV data and file system information of a bridge file, and file system information of an editing result file.

Then, a method will be described for newly generating file system information of the editing result file C and for recording this file system information of the editing result file C at the same time when a bridge file is recorded. FIG. 15 is a flowchart showing an example of a recording process carried out by the CPU 8 for this purpose, in which a part of the recording process in FIG. 12 is changed, and also the steps S5 and S7 are merged with the step S4 in the cut-editing process shown in FIG. 2.

In this process, first, before AV data is recorded in a current block, whether or not AV data is already recorded in a block in which a saturated FS page exists is determined (step S41).

If the answer in step S41 is NO, whether or not the current block is the last block in which AV data of a bridge file is to be recorded is determined (step S42).

If the answer in step S42 is NO, in the current block, the AV data is recorded in pages other than an FS page and a PP page (FIG. 11), picture pointers of AV data in blocks in which AV data has been recorded so far (including the current block) (here, in a case that there exists a saturated PP page in which picture pointers of 128 kbytes are recorded, picture pointers of AV data in the following blocks) are accumulated and recorded in the PP page, and ADs of the AV data in the blocks in which the AV data has been recorded so far (including the current block) and ADs of the saturated PP pages are accumulated and recorded in an AD area of the FS page (FIG. 11) (step S43).

Then, in the memory of the CPU 8, stored contents of a current FS address regarding the bridge file is updated to an address of the FS page in the current block (step S44), and the process moves to the next block for recording (step S45), and then returns to the step S41.

If the answer is YES in the step S42, picture pointers of the editing result file C are generated (corresponding to the step S7 in FIG. 2), and also file system information (AD) of the whole editing result file C is newly generated as described above (step S46).

Then, in the current block, the AV data is recorded in the pages other than an FS page and a PP page, picture pointers of AV data in blocks in which AV data has been recorded so far (including the current block) (here, when there exists a saturated PP page in which picture pointers of 128 kbytes are recorded, picture pointers of AV data in the following blocks) are accumulated recorded in the PP page. Also, ADs of the AV data in the blocks in which the AV data has been recorded so far (including the current block) and ADs of saturated PP pages are accumulated and recorded and also an AD of the PP page in the current block is recorded in an AD area of the FS page, and the picture pointer and ADS of the editing result file C are recorded in the remaining pages (pages other than the FS page and the PP page, in which AV data has not been recorded) (step S47).

Figure 16:
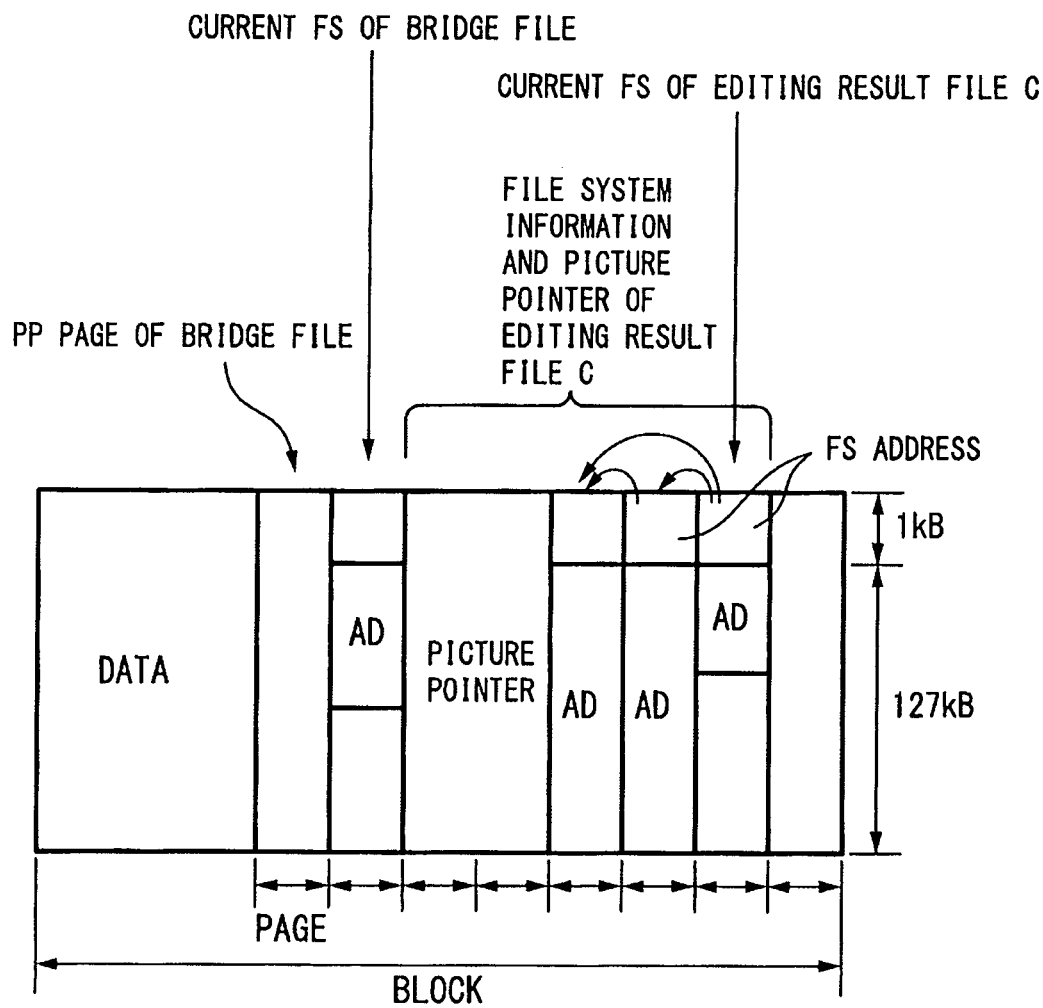
FIG. 16 is a diagram showing a method for recording file system information of an editing result file into the last block of a bridge file.

In this step S47, the ADs of the editing result file C are recorded by a method as shown in FIG. 16. That is, in a page other than a page in which the picture pointers of the editing result file C have been recorded, an area of 1 kbytes, for example, is allocated to an area for recording an address of a saturated FS page as a search index, and the remaining area of 127 kbytes is allocated to an AD area, as in the FS page shown in FIG. 11. Then, an AD of a page which records the ADs and the picture pointers of the editing result file C is recorded in the AD area, and also addresses of all the pages which have already recorded ADs are recorded in the search index area. FIG. 16 shows a state that the ADs of the editing result file C have been recorded in three pages. Among these three pages, an address of the left end page (described as an FS address) is recorded in a search index area of the center page, and addresses of the left end page and the center page are recorded in a search index area of the right end page.

As shown in FIG. 15, following the step S47, in the memory of the CPU 8, stored contents of a current FS address regarding the bridge file are updated to an address of the FS page in the current block, and also an address of the page which has recorded the ADs of the editing result file C lastly in the step S47 is stored in the memory of the CPU 8 as a current FS address regarding the editing result file C (step S48). Then, the process is terminated.

In the example shown in FIG. 16, in the step S48, among the three pages that have recorded the ADs of the editing result file C, an address of the right end page is stored as a current FS address regarding the editing result file C.

If the answer is Yes in the step S41, whether or not the current block is the last block in which the AV data of the bridge file is to be recorded is determined (step S49).

If the answer in step S49 NO, in the current block, the AV data is recorded in pages other than an FS page and a PP page, and picture pointers of AV data in blocks in which AV data has been recorded so far (including the current block) (here, when there exists a saturated PP page, picture pointers of AV data in the following blocks) are accumulated and recorded in the PP page. Also, addresses of all the saturated FS pages are recorded in a search index area of the FS page, and accumulated ADs of AV data in blocks following a block in which a saturated FS page exists (including the current block), accumulated ADs of saturated PP pages, and an AD of the PP page in the current block are recorded in an AD area of the FS page (step S50). Then, the process goes to a step S44.

If the answer is YES in the step S49, picture pointers of the editing result file C are generated (corresponding to the step 7 in FIG. 2), and also ADs of the whole editing result file C are newly generated as described above (step S51).

Then, in the current block, the AV data is recorded in pages other than an FS page and a PP page, and picture pointers of AV data in blocks in which AV data has been recorded so far (including the current block) (here, when there exists a saturated PP page, picture pointers of AV data in the following blocks) are accumulated and recorded in the PP page. Also, addresses of all the saturated FS pages are recorded in a search index area of the FS page, and accumulated ADs of AV data in blocks following a block in which a saturated FS page exists (including the current block), accumulated ADs of saturated PP pages, and an AD of the PP page in the current block are recorded in an AD area of the FS page. Further, the picture pointers and the ADs of the editing result file C are recorded in the remaining pages (pages other than the PP page and the FS page, in which AV data has not been recorded,) as shown in FIG. 16 (step S52). Then, the process goes to a step S48.

By this recording process, the flash memory 4 is not accessed only for recording file system information (AD) and picture pointers of an editing result file C, and the ADs and the picture pointers of the editing result file C are recorded in the last block recording a bridge file, when AV data of the bridge file is recorded. Thereby, it is possible to record the file system information and the picture pointers of the editing result file C without additional consumption of a main storage capacity, while keeping the access performance of the flash memory 4 (the bit rate of AV data during recording/reproduction).

Further, as shown also in FIG. 16, by reading out the current FS page of the editing result file C and then by reading out pages, the addresses of which are stored in a search index area thereof, it is possible to obtain all the ADs of the editing result file C and also to obtain an AD of a page recording all the picture pointers of the editing result file C. Thereby, it becomes possible to easily manage the file system information and the picture pointers of the editing result file C, while keeping the access performance of the flash memory 4.

Here, the present invention is applied to a video server with an editing function in the above-described embodiment of the present invention. However, the cut-editing process and recording process described above can be applied also to an editing apparatus besides the video server. Also, the recording process of AV data and file system information described by use of FIGS. 8 to 10 or FIGS. 11 to 13 can be applied also for recording AV data and file system information in a recording apparatus without an editing function.

It should be understood by those skilled in the art that various modifications, combinations, sub-combinations and alterations may occur depending on design requirements and other factors insofar as they are within the scope of the appended claims or the equivalents thereof.

What is claimed is:

1. An editing apparatus editing a file of video data, a frame size of which being variable, the editing apparatus comprising:
   a recording medium in which a first file and a second file to be edited are recorded; and
   a processing unit implemented in hardware for (1) creating a bridge file for connecting the first file and the second file to be edited based on designation of an IN point of the first file, an OUT point of the second file, and connection points of the first file and the second file,
   wherein a frame preceding the connection point of the first file being made an OUT point of the first file and a frame following the connection point of the second file being made an IN point of the second file, and the bridge file connecting the OUT point of the first file and the IN point of the second file;
   (2) recording the bridge file into the recording medium in which the first and second files are recorded, and (3) creating an editing result file comprising information, as file system information, indicating (a) a recording position from the IN point to the OUT point in the first file, (b) a recording position from the IN point to the OUT point in the second file, and (c) a recording position of the bridge file, in the recording medium, wherein the processing unit generates address information and size information of each frame of the editing result file independently from address information and size information of each frame in the first and second files; and wherein the processing unit is enabled for (i) managing areas corresponding to a recording position of the first file, a recording position of the second file, and a recording position of the bridge file in a recording area of the recording medium, as areas referred to by the first file, the second file, and the bridge file, respectively, and (ii) managing areas corresponding to the recording positions indicated by the editing result file in the recording area of the recording medium, as areas referred to by the editing result file.

2. The editing apparatus according to claim 1, wherein the processing unit is further enabled for deleting only recorded data in areas other than the areas referred to by the editing result file in an area where the first or second file is recorded.

3. The editing apparatus according to claim 1, wherein the video data is video data coded in a Long GOP format, and wherein the bridge file is a re-coded file of frames from the OUT point of the first file to the IN point of the second file, a GOP boundary immediately preceding the connection point of the first file being made the OUT point of the first file and a GOP boundary immediately following the connection point of the second file being made the IN point of the second file.

4. An editing method in an editing apparatus editing a file of video data, a frame size of which being variable, the editing method comprising the steps of:

utilizing a processor for creating a bridge file for connecting a first file and a second file to be edited based on designation of an IN point of the first file, an OUT point of the second file, and connection points of the first file and the second file, wherein a frame preceding the connection point of the first file being made an OUT point of the first file and a frame following the connection point of the second file being made an IN point of the second file, and the bridge file connecting the OUT point of the first file and the IN point of the second file;

recording the bridge file into a recording medium in which the first and second files are recorded; and creating an editing result file comprising information, as file system information, indicating (a) a recording position from the IN point to the OUT point in the first file, (b) a recording position from the IN point to the OUT point in the second file, and (c) a recording position of the bridge file, in the recording medium, generating address information and size information of each frame of the editing result file independently from address information and size information of each frame in the first and second files, wherein the processor is used for (1) managing areas corresponding to a recording position of the first file, a recording position of the second file, and a recording position of the bridge file in a recording area of the recording medium, as areas referred to by the first file, the second file, and the bridge file, respectively, and (2) managing areas corresponding to the recording positions indicated by the editing result file in a recording area of the recording medium, as areas referred to by the editing result file.

5. The editing method according to claim 4, further comprising the step of deleting only recorded data in areas other than the areas referred to by the editing result file in an area where the first file or the second file is recorded.

6. The editing method according to claim 4, wherein the video data is video data coded in a Long GOP format, and wherein the bridge file is a re-coded file of frames from the OUT point of the first file to the IN point of the second file, a GOP boundary immediately preceding the connection point of the first file being made the OUT point of the first file and a GOP boundary immediately following the connection point of the second file being made the IN point of the second file.

7. An editing apparatus editing a file of video data, a frame size of which being variable, the editing apparatus comprising:

a recording medium in which a first file and a second file to be edited are recorded; and a processing unit implemented in hardware for (1) creating a bridge file for connecting the first file and the second file to be edited based on designation of an IN point of the first file, an OUT point of the second file, and connection points of the first file and the second file, wherein a frame preceding the connection point of the first file being made an OUT point of the first file and a frame following the connection point of the second file being made an IN point of the second file, and the bridge file connecting the OUT point of the first file and the IN point of the second file, (2) recording video data of the bridge file into the recording medium in which the first and second files are recorded, (3) creating an editing result file comprising information, as file system information, indicating (a) a recording position from the IN point to the OUT point in the first file, (b) a recording position from the IN point to the OUT point in the second file, and (c) a recording position of the bridge file, in the recording medium, and (4) recording the file system information of the editing result file in an area in a last one of blocks in which the video data of the bridge file has not been recorded, the block being a recording unit of the recording medium, wherein the processing unit generates address information and size information of each frame of the editing result file independently from address information and size information of each frame in the first and second files, and wherein the processing unit records an address of each page, in which the file system information of the editing result file has been already recorded, in a part of an area in each page in which the file system information is to be recorded, and wherein the processing unit further stores an address of a page in which the file system information has been recorded lastly.

8. The editing apparatus according to claim 7, wherein the video data is video data coded in a Long GOP format, and wherein the bridge file is a re-coded file of frames from the OUT point of the first file to the IN point of the second file, a GOP boundary immediately preceding the connection point of the first file being made the OUT point of the first file and a GOP boundary immediately following the connection point of the second file being made the IN point of the second file.

9. The editing apparatus according to claim 7, wherein the recording medium is a flash memory, and wherein the processing unit records the file system information of the editing result file in pages where the video data of the bridge file has not been recorded in a block of the recording medium, the block being made of 64 pages.

10. An editing method in an editing apparatus editing video data file, a frame size of which being variable, the editing method comprising the steps of:

utilizing a processor for (1) creating a bridge file for connecting a first file and a second file to be edited based on designation of an IN point of the first file, an OUT point of the second file, and connection points of the first file and the second file, wherein a frame preceding the connection point of the first file being made an OUT point of the first file and a frame following the connection point of the second file being made an IN point of the second file, and the bridge file connecting the OUT point of the first file and the IN point of the second file; and (2) recording video data of the bridge file into a recording medium in which the first and second files are recorded, (3) creating an editing result file comprising information, as file system information, indicating (a) a recording position from the IN point to the OUT point in the first file, (b) a recording position from the IN point to the OUT point in the second file, and (c) a recording position of the bridge file, in the recording medium, and (4) recording the file system information of the editing result file in an area of the recording unit in a last block in which the video data of the bridge file is recorded, the last block being a recording unit of the recording medium, and (5) recording an address of each page, in which the file system information of the editing result file has been already recorded, in a part of an area in each page in which the file system information is to be recorded, and wherein the processing unit further stores an address of a page in which the file system information has been recorded lastly, and generating address information and size information of each frame of the editing result file independently from address information and size information of each frame in the first and second files.

11. The editing method according to claim 10, wherein the video data is video data coded in a Long GOP format, and wherein the bridge file is a re-coded file of frames from the OUT point of the first file to the IN point of the second file, a GOP boundary immediately preceding the connection point of the first file being made the OUT point of the first file and a GOP boundary immediately following the connection point of the second file being made the IN point of the second file.

12. The editing method according to claim 10, wherein the recording medium is a flash memory, and wherein in the second step, the file system information of the editing result file is recorded in pages where the video data of the bridge file has not been recorded in a block of the recording medium, the block being made of 64 pages.

13. The editing method according to claim 12, wherein in the second step, an address of each page, in which the file system information of the editing result file has been already recorded, is recorded in a part of an area in each page in which the file system information is to be recorded, and wherein the editing method further comprises the step of storing an address of a page in which the file system information has been recorded lastly.

* * * * *